(12) United States Patent
Monteith et al.

(10) Patent No.: US 8,132,328 B2
(45) Date of Patent: Mar. 13, 2012

(54) METHOD OF MAKING STRUCTURAL MEMBERS

(76) Inventors: John Lennox Monteith, Burnley (GB); Ivan James Dean, Burnley (GB); Trevor Watmough, Burnley (GB)

( * ) Notice: Subject to any disclaimer, the term of this patent is extended or adjusted under 35 U.S.C. 154(b) by 1564 days.

(21) Appl. No.: 10/543,686

(22) PCT Filed: Jan. 19, 2004

(86) PCT No.: PCT/GB2004/000157
§ 371 (c)(1),
(2), (4) Date: Jun. 27, 2006

(87) PCT Pub. No.: WO2004/069527
PCT Pub. Date: Aug. 19, 2004

(65) Prior Publication Data
US 2006/0248850 A1    Nov. 9, 2006

(30) Foreign Application Priority Data

Feb. 4, 2003 (GB) .................................. 0302442.9
May 22, 2003 (GB) .................................. 0311864.3

(51) Int. Cl.
*B21D 53/88* (2006.01)
(52) U.S. Cl. ......................................... 29/897.2; 29/897
(58) Field of Classification Search .................... 29/897, 29/897.2, 897.3–897.35
See application file for complete search history.

(56) References Cited

U.S. PATENT DOCUMENTS

| | | | | |
|---|---|---|---|---|
| 2,483,174 A | * | 9/1949 | Belsinger | 229/122.23 |
| 3,867,935 A | * | 2/1975 | Eisdorfer et al. | 604/385.201 |
| 3,875,616 A | * | 4/1975 | Trott | 19/163 |
| 3,965,907 A | * | 6/1976 | Hardy et al. | 604/362 |
| 5,330,818 A | | 7/1994 | Langley | |
| 5,431,870 A | | 7/1995 | Andre | |
| 6,489,001 B1 | | 12/2002 | Cazzato et al. | |

FOREIGN PATENT DOCUMENTS

| | | | |
|---|---|---|---|
| EP | 0 415 869 A | 3/1991 | |
| WO | WO 91 15357 A | 10/1991 | |

* cited by examiner

*Primary Examiner* — Richard Chang
(74) *Attorney, Agent, or Firm* — Shumaker, Loop & Kendrick, LLP

(57) ABSTRACT

A method of making a fibrous structural member including first, second, third and fourth portions, including folding first and second portions including continuous filaments about a first common fold such that the first and second portions are adjacent and substantially parallel to each other, folding a third portion about a second fold common with the first portion such that the third portion extends from the first and second portions at an angle thereto, and folding a fourth portion about a third fold common with the third portion such that the fourth portion is adjacent and substantially parallel to the third portion.

28 Claims, 17 Drawing Sheets

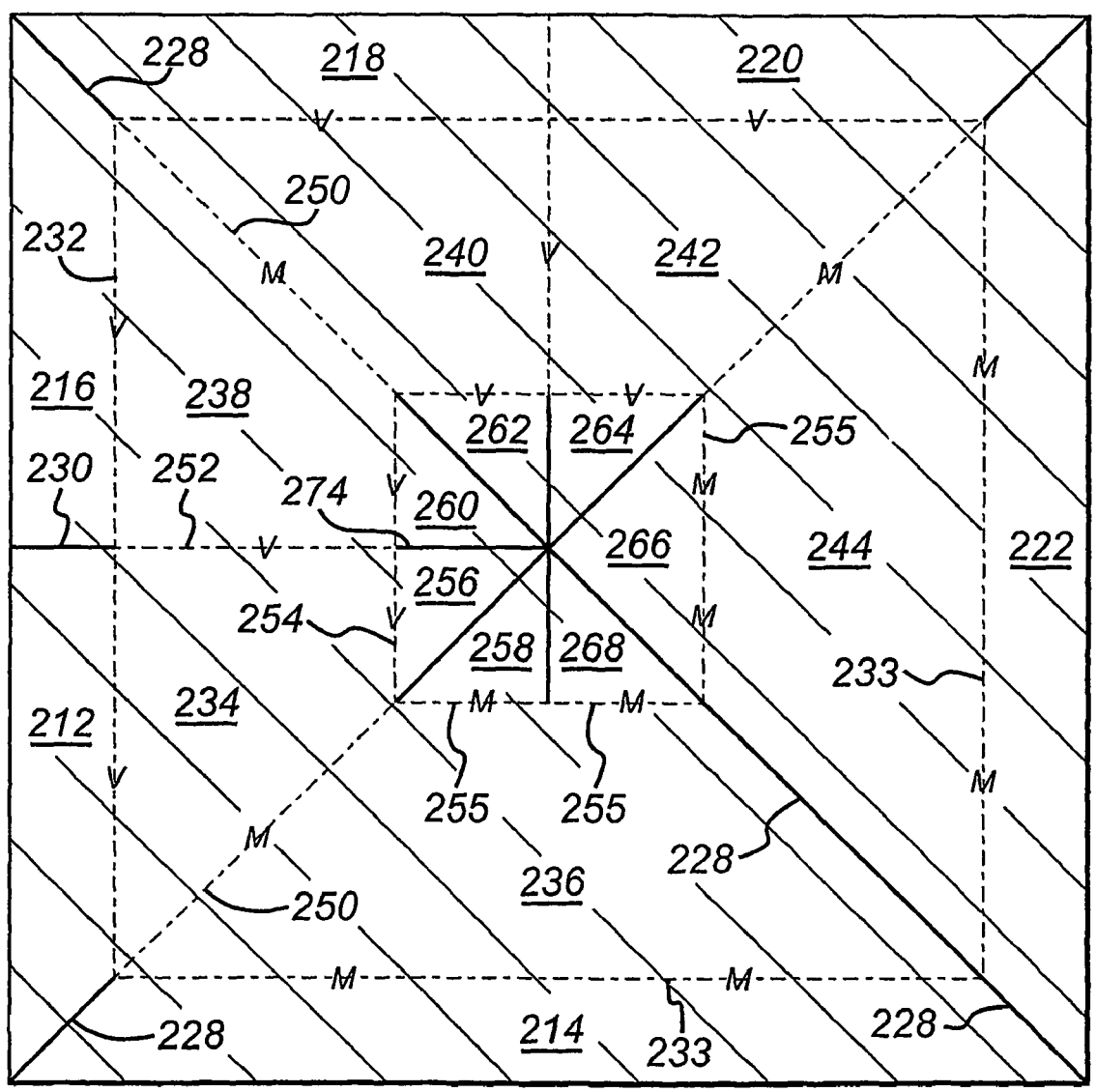

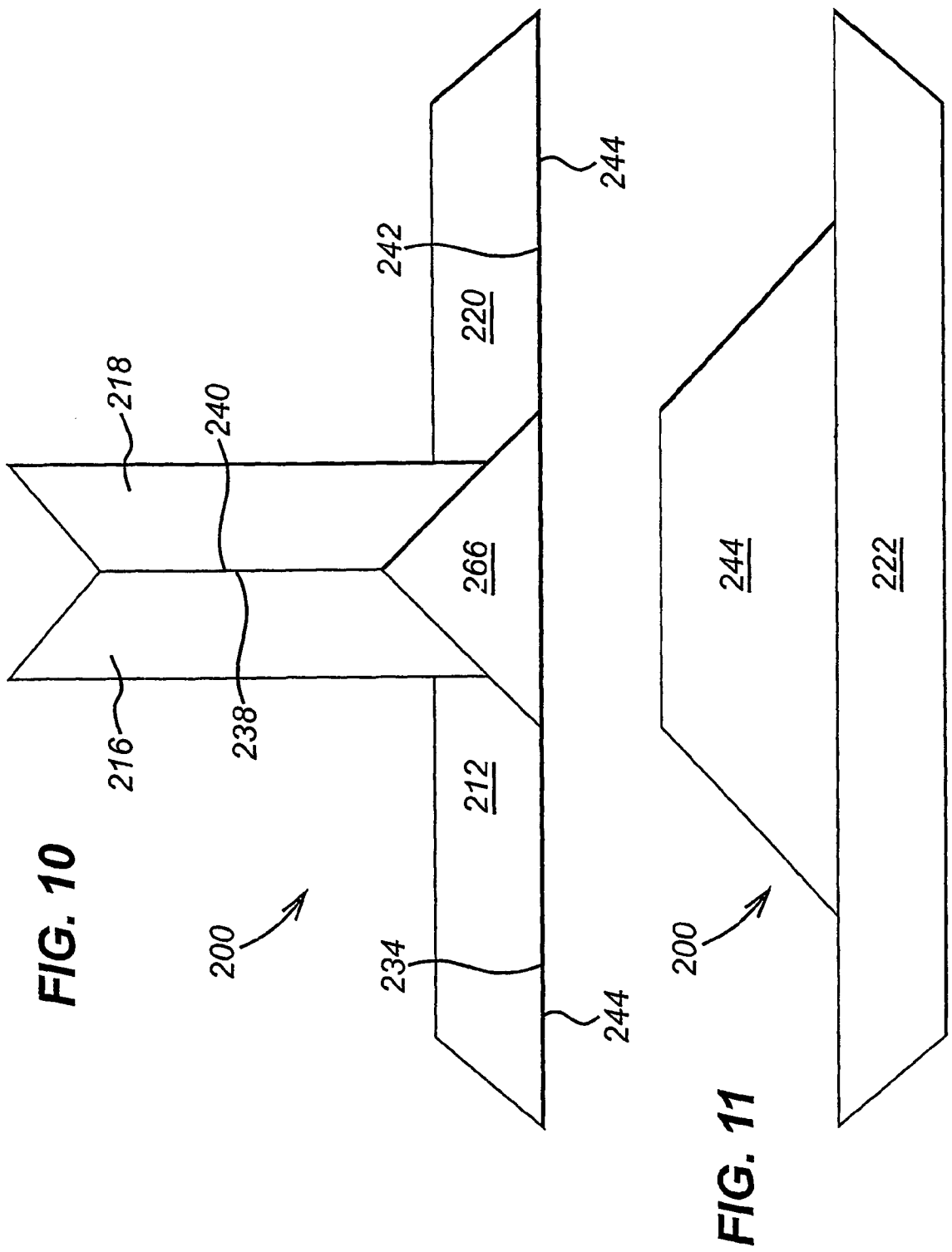

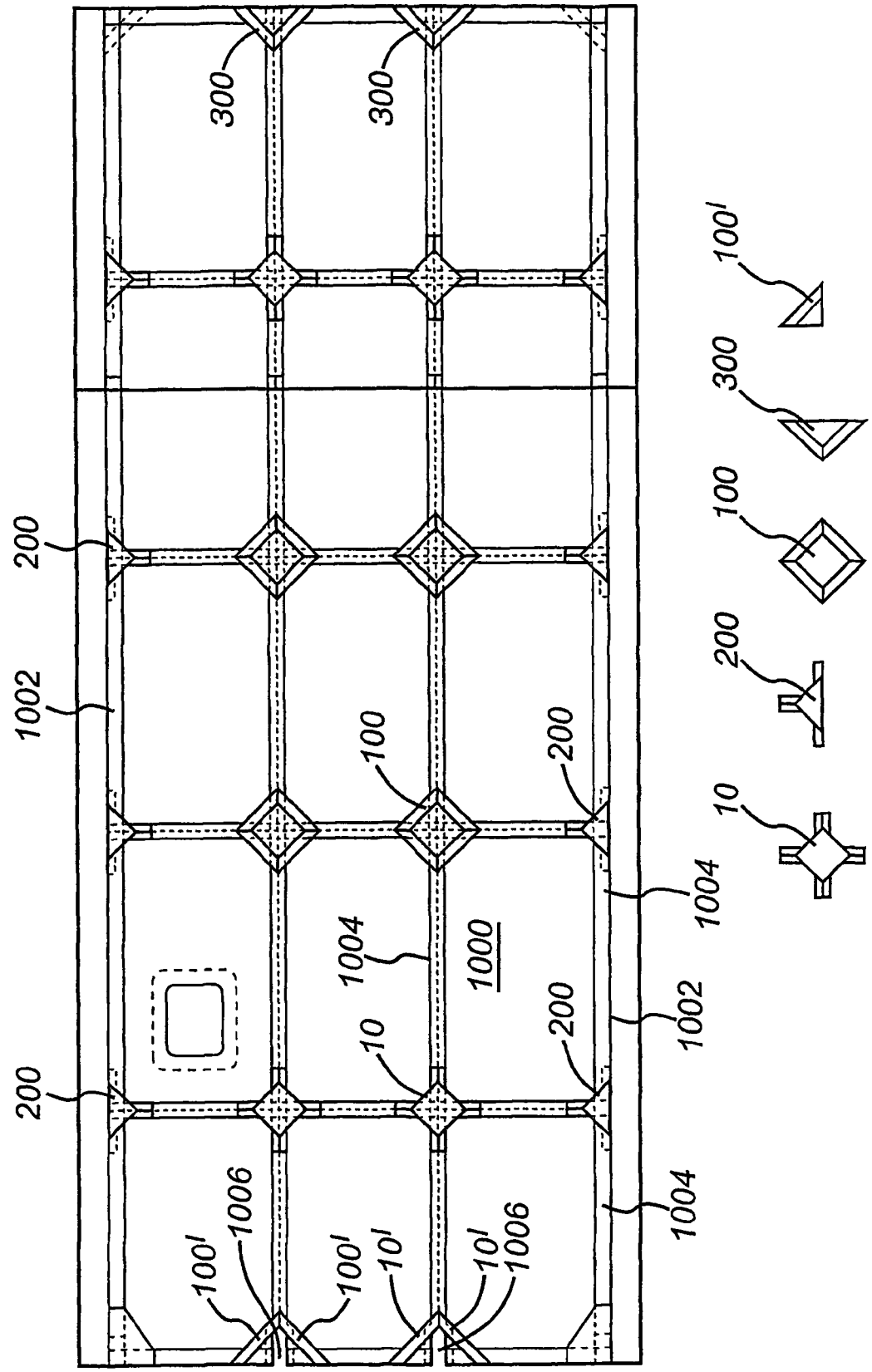

METHOD OF MAKING STRUCTURAL MEMBERS

This is a national phase application of International Application PCT/GB04/000157, filed Jan. 19, 2004, and claims priority to United Kingdom Patent Application No. 0302442.9, filed Feb. 4, 2003 and United Kingdom Patent Application No. 0311864.3, filed May 22, 2003. The present invention relates to a method of making a structural member and a structural member. The present invention is particularly, although not exclusively, applicable to aeronautical structural members and a method of making such members.

It is known to provide a cross joint for use in aircraft. These have four vertical faces extending from a central point at 0°, 90°, 180 and 270° to each other. These form a "star" or "cruciform" shape. To make the structure, carbon fibre material is cut into sheets of the appropriate shapes. Then each layer is bent at right angles to form part of two adjacent faces. The shaped and bent material is placed in a mould and carbonised. Cutting the shapes is time consuming and requires great accuracy. Laying the shapes up is also time consuming and skilful. In this respect it will be appreciated that a minimum of four pieces must be cut to be bent into the four corners and then be carefully placed in the mould.

It is an object of the present invention to overcome at least one of the above or other disadvantages.

According to a first aspect of the present invention a method of making a structural member comprises folding at least first and second integral portions whereby the portions lie adjacent to each other.

The method may comprise folding the first and second portions about a first, common fold.

The first and second portions may be folded to lie adjacent to each other in generally parallel walls.

The angle change undergone about the first fold may be greater than 0° or less than 180° and in the region of 90°.

The method may comprise folding the first and second portions to lie against each other.

The method may comprise folding at least a third portion to extend from the first and second portions at an angle thereto such as perpendicular thereto. The method may comprise folding the third portion about a second fold common with the first portion. The second fold may be arranged to move through less than 180° and in the region of 90°.

The line of the first fold may be made at an angle to the line of the second fold such as more than 0° or less than 90° or in the region of 45°.

The method may comprise folding a fourth portion about a third fold, which third fold may be common with the third portion, such that the fourth portion lies adjacent to the third portion. The third portion and the fourth portion may be folded to lie against each other. The third fold may be more than 0° or less than 180° or in the region of 90°. The third fold may be at an angle to the second fold and may be more than 0° and less than 90° or in the region of 45°.

The method may comprise folding the first, second, third and fourth portions to form a structural member having walls having at least a partial extent in the x, y and z axes such as by walls extending in the exact direction of those axes.

The method may comprise folding a fifth and sixth portion with or without there being any third and fourth portions. The folding may result in the fifth and sixth portions being adjacent to each other such as by contacting each other. The folding of the fifth and sixth portions may be about a fourth fold common with those portions. The angle of the fourth fold may be greater than 0° or less than 180° or in the region of 90°.

The method may comprise making the angle of the fourth fold with respect to the first fold to be less than 180° or greater than 0° or in the region of 90°.

The method may comprise folding the fifth portion to be in generally the same plane as the first portion.

The method may comprise folding the sixth portion to be generally in the same plane as the second portion.

When the third and fourth portions are present the method may comprise folding the fourth and fifth portions about a fifth fold which fifth fold may be less than 180° or more than 0° or in the region of 90°.

With the third and fourth portion present and with or without the fifth and sixth portions, the method may comprise folding seventh and eighth portions about a sixth fold to be adjacent to each other such as by contacting each other.

The seventh and eighth portions may extend in generally the same direction, such as in the same plane, as the fourth and third portions.

One end of the first and second portions and the one end of the fifth and sixth portions may be in the same general region and may substantially meet in that region. One end of the third and fourth portions and the seventh and eighth portions may be in the same general region and may generally meet in that region.

The method may comprise folding a ninth portion or portions, with or without any of the third to eight portions attached to any one or more of the first to eighth portions (when any one or more of the third to eighth portions are present) about a seventh fold common with the first portion or a different ninth portion common with the second portion or both which fold may be greater than 0° or in the region of 180° or less than 180° or in the region of 90°. At least two ninth portions may overlap each other and may so overlap over their complete extent and may extend in generally the same direction such as a curve or a plane. The or each ninth portion may extend at an angle to the horizontal over at least part of their extent when the first and second portions extend vertically. At least two ninth portions may form a plane. The plane may be inclined downwardly or upwardly from the first and second portions and may be perpendicular to the first and second portions. Alternatively, the plane may be at an angle other than 90° to the first and second positions. The method may comprise folding a tenth portion with or without any of the third to ninth portions about an eighth fold common with the first portion or a different tenth portion common with the second portion or both which eighth fold may be greater than 0° or less than 180° or in the region of 90°. The seventh and eighth folds when on a common first or second portion may be parallel to each other. The seventh or eighth fold or both when common with the first portion, may extend to the second fold, when the second fold is present and, alternatively or additionally either or both may extend to the first fold. If any of the third to eighth portions are present the method may include folding a portion extending from any or all of those portions about a fold having the same relative properties as the seventh fold with respect to the angle that the portion extends from. Alternatively or additionally, if any of the third to eighth portions are present, any or all may include a portion extending there from about a fold having the same properties as the eighth fold. When two tenth portions are present they may overlap each other over at least, or only, along part of their coextent. When two tenth portions are in the same general plane but at an angle to each other, at least one and preferably both tenth portions may include a part which extends at least partly across that angle.

At least one ninth portion and at least one tenth portion may be formed to be spaced from each other and they may extend in planes which may be parallel. Alternatively they may be curved and may have the same curvature. At least one ninth and one tenth portion may be formed to face each other over at least part of their co-extent. At least one ninth portion and one tenth portion may be perpendicular to each other.

The method may comprise folding adjacent portions formed by a fold having the properties of the seventh fold to be adjacent to each other such as by contacting each other which portions may be completely co-extensive with each other. Alternatively or additionally the method may comprise folding adjacent portions formed by folding about an eighth fold to be adjacent to each other such as by contacting each other and which may be completely co-extensive with each other.

When forming the tenth portion or portions, with or without the third to ninth portions, the method may comprise forming the tenth portion or portions to extend substantially the same distance from the eighth fold along substantially its complete length. Alternatively, the tenth fold may define a portion of decreasing distance from the eighth fold in one direction along the eighth fold which decreasing distance may result in the portion formed by the eighth fold reaching the end of the eighth fold.

At least one tenth portion may be folded through 180° about its common fold with another portion to lie adjacent to that other portion which may result in contacting of those portions.

Any or all of the first and second or the third and fourth or the fifth and sixth or the seventh and eighth portions may be co-extensive with each other such as over part of that co-extent or over the complete extent of each portion. The fourth and fifth portions may be connected to each other. The sixth and seventh portions may be connected to each other.

The first portion may be co-extensive with the second portion over the complete extent of the first portion but only part of the co-extent of the second portion such as 50% of the second portion.

The fifth portion may be co-extensive with the second portion over the complete extent of the fifth portion but only part of the second portion such as 50% of the second portion.

The sixth and second portions may be co-extensive with each other over their complete co-extent and may contact each other.

One of the sixth or second portions may be adjacent to the first and fifth portions and may contact those portions, for instance about their complete co-extent.

In an alternative method, the seventh and eighth portions are folded about the sixth and second portions respectively to lie adjacent to each other and preferably to contact each other. The seventh and eighth portions may be located between the fourth and third portions. The seventh portion may contact the third portion and, alternatively or additionally, the eighth portion may contact the third portion. The third, fourth, seventh and eighth portions may be co-extensive over their complete extent.

The fold between the sixth and seventh portions may be greater than 0° or less than 180° and preferably in the region of 90°.

The fold between the second and eighth portions may be greater than 0° or between 180° and preferably in the region of 90°.

The fifth and sixth portions may be in the same plane as the first and second portions respectively and may include an edge from each portion that meet in a common region.

The present invention also includes making a structural member by folding at least three portions about at least two folds such that the portions lie adjacent to each other to form a member that includes at least a part that is three portions in thickness. The present invention also includes a method of making a structural member by folding at least four portions about at least three folds such that the structural member is at least four portions thick over at least part of the extent of the member.

Where two or more portions extend in the same direction, whether or not they are co-extensive, they may be connected by one or more strengtheners such as a strengthener comprising tape such as unidirectional tape. The strengthener may be arranged to be on the outside of the structural member. Alternatively, the strengthener may be arranged to be trapped between two portions over at least part, and preferably its complete extent.

The present invention also includes any two or more adjacent portions being connected together such as by fasteners such as by Z pin fasteners extending between and possibly through the portions.

The present invention also includes making the structural member by folding the portions from a flat form such as rectangular or a square form. The method may comprise forming cuts in the flat form which cuts may be made prior to effecting the movement of the portions about a fold or folds. The method may comprise making the cuts by a water jet or a knife. The method may comprise varying the size of the cuts in order to vary the size of any of the portions. The method may comprise making openings in the flat form.

The method may comprise forming the member from the flat form by causing the first and second portions and possibly further portions to be folded about at least one fold which passes or, when extended, would pass through the centre line of the form. The method may comprise forming the first and second portions and possibly further portions to be folded about a fold line which passes or, when extended, passes through the centre of at least one side and preferably through the centre of opposed sides of the flat form, for instance when the form is of rectangular shape. Alternatively or additionally, the method may comprise forming at least two of the portions by a fold line which passes or, when extended, passes through at least one corner and preferably through opposed corners of the form, for instance when the flat form is of rectangular shape.

The present invention also includes selecting and making one of at least two possible shapes from a form and the method may comprise selecting a form having the same cuts and making one of at least two possible shapes from that form.

The method may comprise cutting a form to make at least one and preferably two different shapes from the cut form. The method may comprise making two identical shapes from a cut form. The method may comprise cutting a form into two equal halves. The method may comprise cutting a form from side to side or corner to corner.

The method may comprise forming spaced parallel folds.

The method may comprise making the member with at least some, and preferably all of the portions integral with each other.

It will be appreciated that where the term "fold" is used herein it is intended to cover an arc fold or a fold defined by two or more closely spaced parallel folds. One or more of the folds may be a valley fold and alternatively or additionally one or more of the folds may be a mountain fold.

It will be appreciated that portions may have an extent that is other than planar.

The method may comprise making the form with continuous fibres which may extend in a common direction. The method may comprise making the form with continuous or elongate fibres that extend in different directions which may comprise only two directions or only three directions or more than three. When the continuous fibres extend in two directions they may be at right angles to each other. When the fibres extend in three directions they may extend at 60° to each other. The fibres may be woven.

The method may comprise folding a flat form having continuous fibres extending in at least one direction such that those fibres, when folded, extend in different directions between adjacent portions.

The method may comprise making the form with two or more layers such as by placing one layer on top of the other layer or layers. The method may comprise connecting one layer to another layer or layers such as by connecting the layers with staple fibre. The method may comprise simultaneously folding overlapped layers.

The method may comprise making the first and second portions and, alternatively or additionally, at least some or all of the other portions of a hardenable material. The method may comprise hardening the material after making the shape of a structural member such as by carbonising the material.

The method may comprise attaching a further structural member, which may or may not have been formed by the method as herein referred to, to a structural member formed by the method as herein referred to.

The method may comprise attaching the further structural member after partially hardening the structural member. The method may comprise directly or indirectly connecting at least two structural members made in accordance with the present invention.

According to a further aspect of the present invention a structural member includes integrally formed first and second portions that lie adjacent to each other.

The first and second portions may include a fold that is common with the first and second portions.

The member may include integrally formed third and fourth portions lying adjacent to each other at an angle to the first and second portions. The first, second, third and fourth portions may be integrally formed. The third and fourth portions may have any of the properties of the first and second portions. That angle may be in the region of 90°. At least one of the first or second portions may be connected to at least one of the third or fourth portions by a common fold. At least one edge of the third and fourth portions may extend to the same general region of at least one edge of the first and second portions.

The member may include fifth and sixth portions which may be integral with each other and which may be integrally formed with any or all of the other portions. The fifth or sixth portions may have any of the features of the first and second portions. When the first and second and fifth and sixth portions are planar, at least one or preferably both of the first or second portions are in the same plane as at least one or preferably both of the fifth and sixth portions.

At least one edge of the fifth and sixth portions may extend to the same general region as at least one edge of the first and second portions on the edge of third and fourth portions or to all those portions.

The member may include seventh and eighth integrally formed portions The seventh and eighth portions may have any of the features of the first and second portions. The seventh and eighth portions may be integrally formed with the first and second or the third and fourth or the fifth and sixth portions or any combination thereof. The seventh and eighth portions, when planar may include at least one side in the same general region as the fifth and sixth portions or the third and fourth portions or the first and second portions or any combination thereof.

Any of the above portions may extend in the same common direction, such as upwardly, even though they are at an angle to each other.

The member may include further portions extending at an angle to any one of the above referenced to first and second portions or any of the other portions, when present which are at an angle such as 90° to the common direction of the other portions and may be integrally formed with each other and the first and second portions.

The further portions may include any of the features of the first and second portions.

The further portions may all be in the same general direction such as in the same plane.

The further portions may include a common edge with the portions from which they extend.

The further portions may include an edge that extends to the general region of at least some of the other portions.

The further portions may overlap each other over at least part of their extent and preferably their whole extent.

Further portions may be provided that extend from opposite ends of the first and second portions or from the opposite ends of all of the portions and at least some of those extending from opposite ends may face each other over at least part of their co-extent.

The member may include stiffeners over adjacent pairs of portions that are in the same plane.

The member may include at least one area that is of three or four layers thick.

The member may include a non linear top surface or bottom surface or both. For example, that surface or those surfaces may be curved such as in a convex or concave direction.

The member may include upper and lower surfaces which may be parallel to each other or which may be at an angle to each other. The height of the member may decrease from one side of the member to the other.

The member may be comprised of two or more units each comprising integrally formed first and second portions that lie adjacent to each other with one portion from the one unit lying adjacent to one portion or between two portions of the other unit.

The members may include at least a part having continuous filaments extending at an angle to each other such as the first portion having filaments extending in a first direction and the second portion having filaments at a second, different direction.

The members may include at least a part having filaments extending at 60° or 90° or 45° to each other. The first and second portions or indeed any or all of the other adjacent portions may contact each other over at least part of their co-extent and may lie against each other over at least part of their co-extent.

The first and second portions or indeed any or all of the other adjacent portions may be parallel to each other over at least part of their extent.

The first and second portions or indeed any or all of the other adjacent portions may be planar.

The member may include at least one portion that extends in a straight direction or, alternatively or additionally, at least one portion that extends in a curved direction which may comprise any of the numbered portions referred to herein.

The member may include at least one portion which extends upwardly and at least another portion that extends in a direction transverse thereto such as at an angle to the horizontal or in a horizontal plane. The member may include at least two portions that extend upwardly and at an angle to each other with at least one other portion extending transverse thereto such as at an angle to the horizontal with that transverse portion also being perpendicular to one of the upwardly extending portions or at an equal angle to the two upwardly extending portions.

The member may comprise at least one T section which may comprise an I section. The top of the T may include an upper panel and two lower panels, each connected, such as by a hinge, to either side of the top panel and each extending beneath the top panel such as to the mid region thereof. At least one, and preferably both lower panels may each be connected, such as by a hinge, to a downwardly extending panel forming the upright of the T. At least one downwardly extending panel may have a bottom panel attached thereto and extending outwardly, beneath the upper panel. Where two downwardly extending panels have bottom panels attached thereto these day extend in opposite directions.

The member may include at least two T or I section members. These may extend at an angle to each other or generally in line with each other or, when there are more than two T or I shaped members, both generally in line and at an angle. The T or I shaped members may each be formed as described above. At least two adjacent T or I shaped members may overlap such as by the top of the T or I shaped members overlapping at a junction region. At least two adjacent T or I shaped members may include a common bottom panel. At least two adjacent T or I shaped members may include a panel connected to the downwardly extending panel of one member extending along the downwardly extending panel of the other member such as between two downwardly extending panels of the other member.

The member may include a curved upwardly or downwardly extending surface or both. The curve may be convex or concave or both, for instance in different directions. The curvature in one direction may be different from the curvature in another direction.

The member may have been formed from a flat form.

The member may be a relatively hard member and may include carbon fibre, glass fibre or kevlar material for example or any combination thereof and may have been heat treated such as by being carbonised.

The present invention also includes a structural member as herein referred to connected to a further structural member which further member may or may not be as herein referred to. The present invention also includes a pair of structural members as herein referred to connected directly or indirectly.

The present invention also includes a structural member when made by a method of making a structural member as herein referred to.

The structural member may be an aeronautical structural member.

Where the term "portion" is used herein these may be termed "panels" such as planar or flat panels.

Where numbers have been given to folds or portions it will be appreciated that not all preceding lower numbers of portions or folds need be present. For instance when the method refers to a first and second portion and then a ninth portion it is possible that, in some instances, the method may require only three or more panels such as the first, second and ninth panels or the first, second, fifth and ninth panels.

The present invention can be carried into practice in various ways but several embodiments will now be described by way of example and with reference to the accompanying drawings.

FIG. 9 is a plan view of a square sheet of fibres to be made up into a uniform T-joint 200;

FIGS. 10 and 11 are plan and side views of the T-joint 200 formed from the sheet shown in FIG. 9;

FIG. 22 is a plan view of a skin having various joints mounted thereon.

Figure 1:
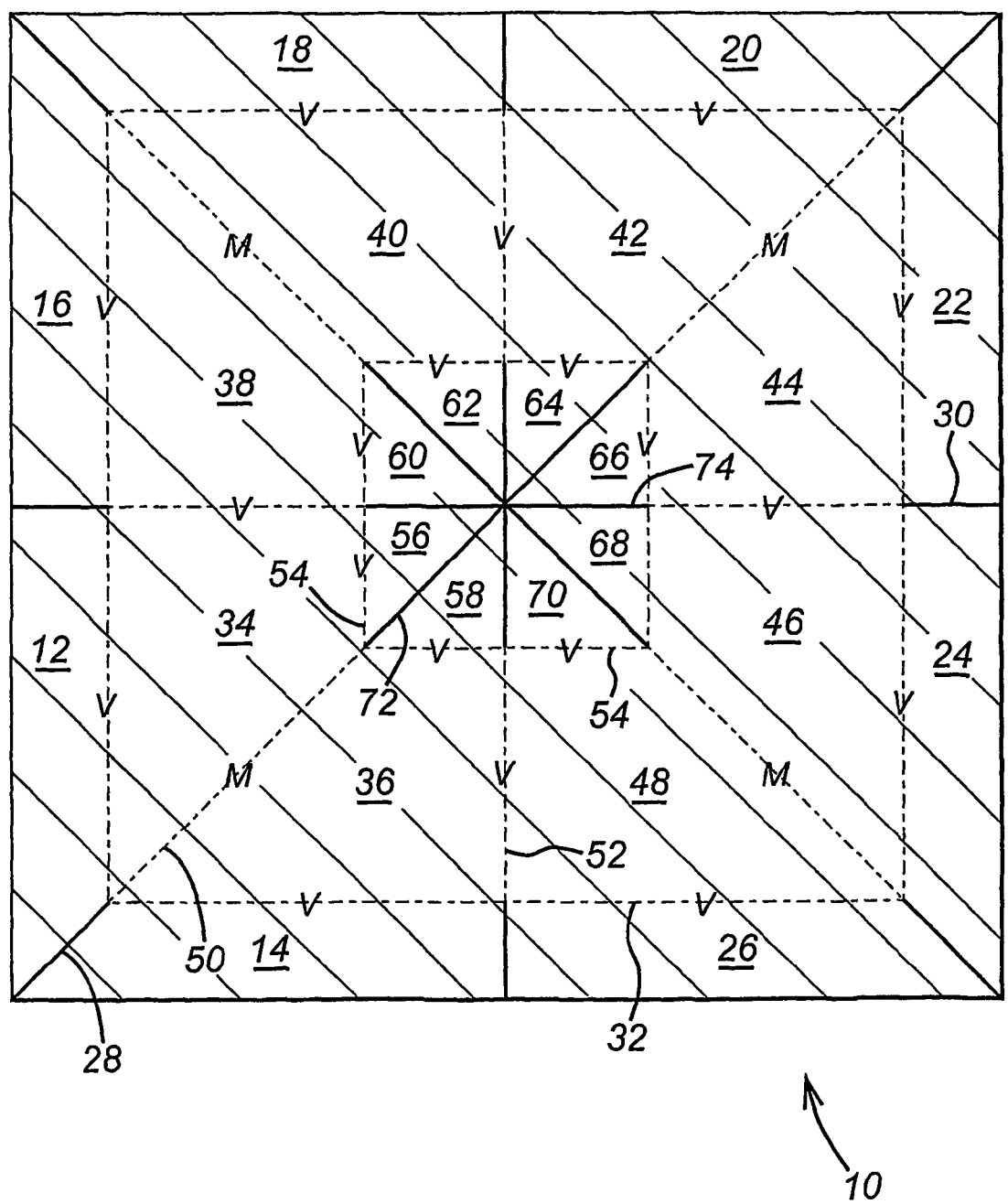
FIG. 1 is a plan view of a square sheet of fibres to be made up into a cross joint 10.

In the drawings, folds marked with an M are those about which the line of folding is arranged to form a "mountain" and those marked with a V are those which are folded to form a "valley" with respect to the plan view of the flat sheets.

Referring to FIG. 1, a plurality of base panels 12, 14, 16, 18, 20 and 22, 24 and 26 are each defined by a free edge of the panel, cuts 28 that extend at 45° with respect to the angle of the sides from each corner and cuts 30 that extend in from the mid point of each side perpendicular to that side. The cuts extend from the edges to reach valley folds 32 that are parallel to their adjacent side and equidistant from each of the four sides.

Eight panels 34, 36, 38, 40, 42, 44, 46 and 48 are provided that, in use, are arranged to extend vertically upwards. These are defined by the valley fold 32 with their sides being defined by a mountain fold 50 that is aligned with each cut 28 and a valley fold 52 that is aligned with each cut 30. The upper regions of the panels and defined by four valley folds 54 that are parallel with a different one of the sides and equidistant from each parallel side.

The centre of the square sheet is defined by eight panels 56, 58, 60, 62, 64, 66, 68 and 70 that are arranged, when assembled, to be horizontal. These are defined by the valley folds 54 and cuts 72 that are aligned with the mountain folds 50 and cuts 74 that are aligned with the valley folds 52. The cuts 72 and 74 meet at the centre of the square.

Figure 2:
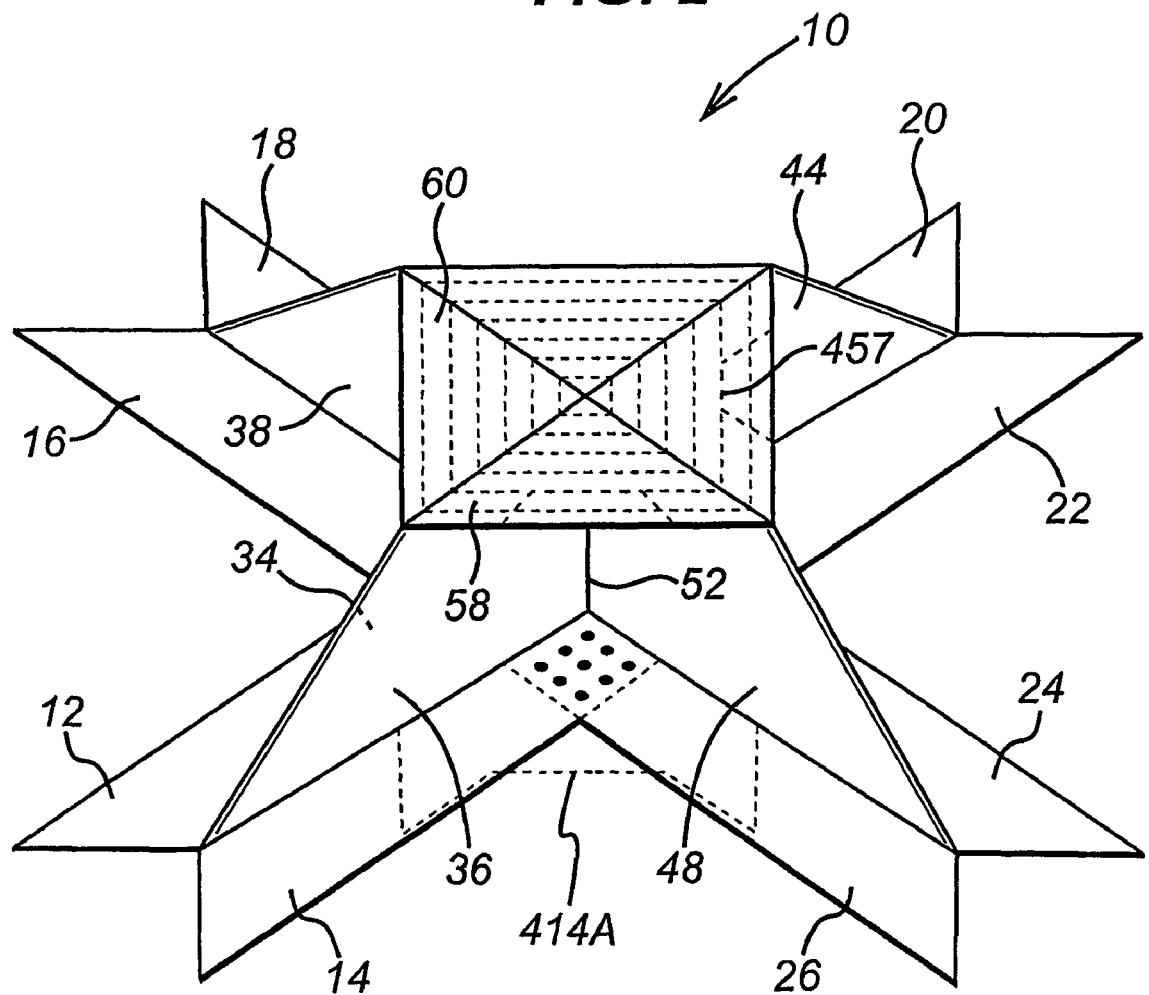
FIG. 2 is an isometric view of the cross joint 10.

To assemble the cross joint the sheet is folded up into the configuration shown in FIG. 2. The folding can be in any sequence.

The base panels 12 to 26 lie horizontally at the base of the joint with the innermost portion of the panel 14 overlapping the innermost portion of the panel 26 and so on around the joint.

The panels 34 to 48 extend vertically. Panels that include a common mountain fold 50 extend alongside each other and in contact with each other such as the panels 34 and 36. Panels that include a valley fold 52 between them, such as panels 36 and 48 extend perpendicularly to each other.

The panels 56 to 70 lie horizontally with the panel 58 overlapping completely the panel 70 and the panel 60 overlaying the panel 56 and so on around the structure.

It can be seen that the vertical part of the structure is all of double thickness of the panel as is the top, horizontal part of the structure.

In order to further increase the strength of the joint tape 76 made from uni-directional fibres can be located to extend across the centre of the joint by being located between the panels 46 and 48 on one side and panels 38 and 40 on the other side. Such U-D tape 78 can also extend between the other pairs of panels. Such tapes can be used across any of joints in any of the other structures referred to herein with the tape either being trapped between panels or on an exposed face of a panel.

Figure 4:
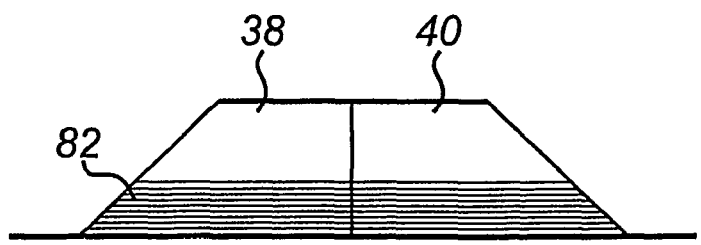
Figure 5:
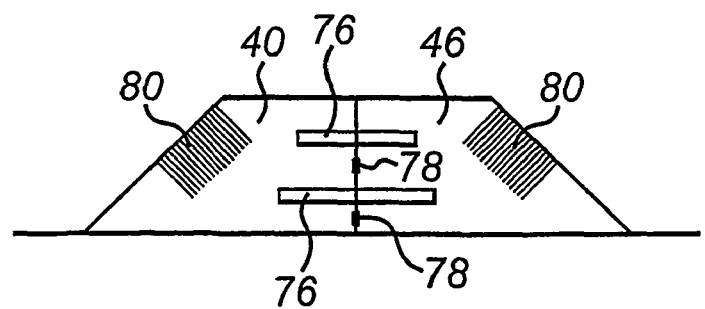
FIG. 5 is a sectional view taken along the line 5-5 of FIG. 3.

In FIG. 1, the sheet is made up with uni-directional fibres 80 extending at 45° to the sides. These may be UD or woven fibres or a combination thereof which may be pre-impregnated with resin. When the sheet is formed into the cross joint, as shown in FIG. 5, the fibres 80 on the vertical panels will extend at 45° to the horizontal to provide a joint with a first strength resistance characteristic. With the woven fibres 82 extending parallel to the sides of the sheet, the U-D fibres extend horizontally, as shown in FIG. 4 to produce a joint with a second strength resistance characteristic. With the U-D fibres extending horizontally a much greater resistance to tension across the joint is provided as compared to the joint having the first characteristic. Such lay ups may be applied to any of the herein referred to embodiments.

In an alternative lay up configuration, the sheet could have U-D or woven fibres at right angles to each other. For instance, the fibres could be parallel to the sides of the sheet or, at +45° or −45° to the sides. In a further alternative, the U-D fibres could be arranged in a common direction other than parallel to or at 45° to the sides of the sheet with, for instance, three angles at 60° to each other. Alternatively or additionally, the sheet could have more fibres extending in one direction than another. In this way the optimum strength in the required direction of steps of the joint can be built up. Any of the lay ups of the U-D or woven fibres can be used in any of the embodiments described herein. Where the fibres extend at an angle to each other, these could be formed by layers with discrete angled fibres being laid on top of each other without, initially, being connected or by layers that are connected by cross links such as by staple fibre which could be needled across the layers. Again such lay ups could be applied to any of the embodiments referred to herein. The angles of the fibres to each other can be chosen to enhance the strength of the formed shape in one or more directions, for instance.

Figure 6:
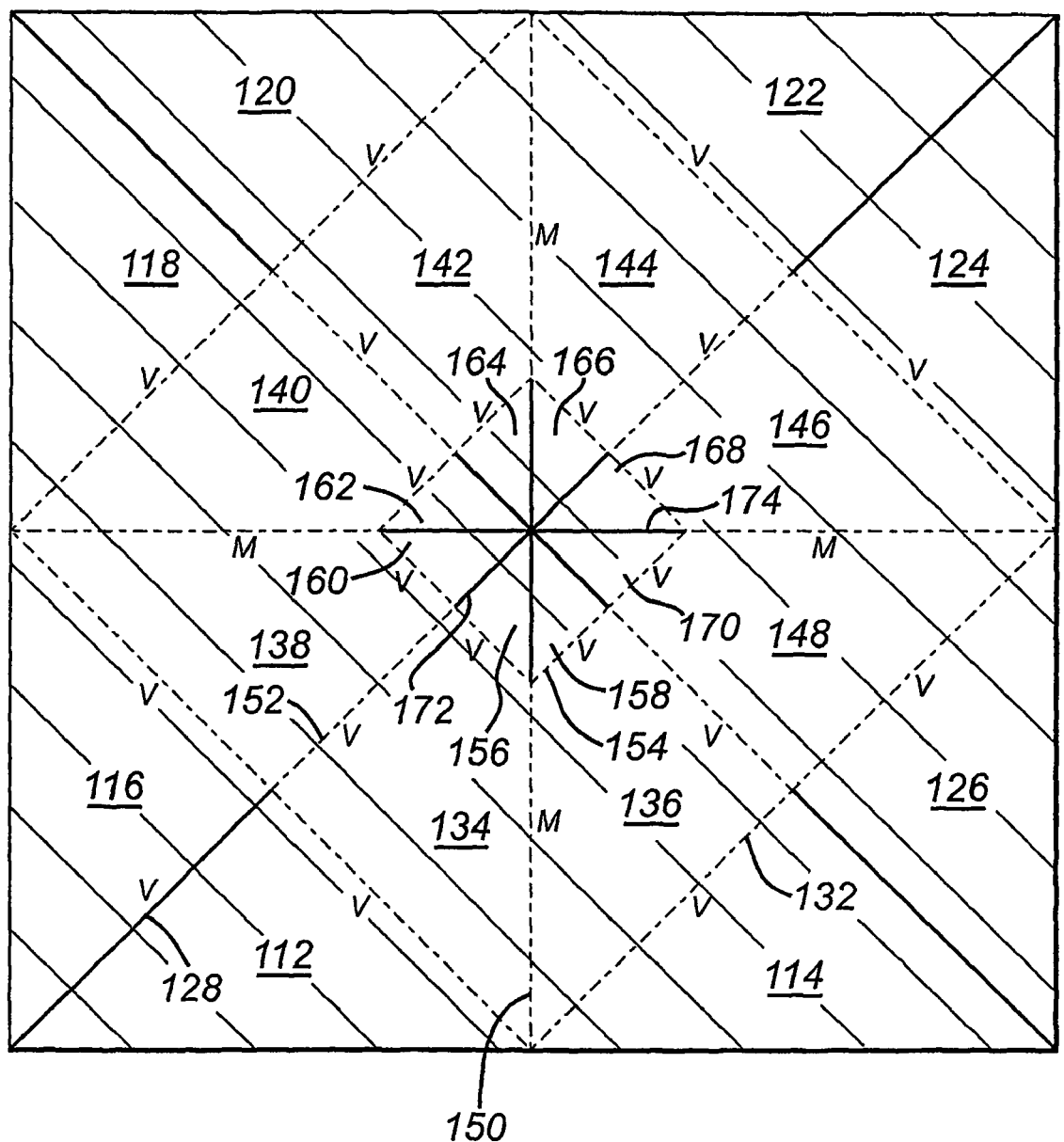
FIG. 6 is a plan view of a square sheet to be made up into a diamond joint 100.
Figure 7:
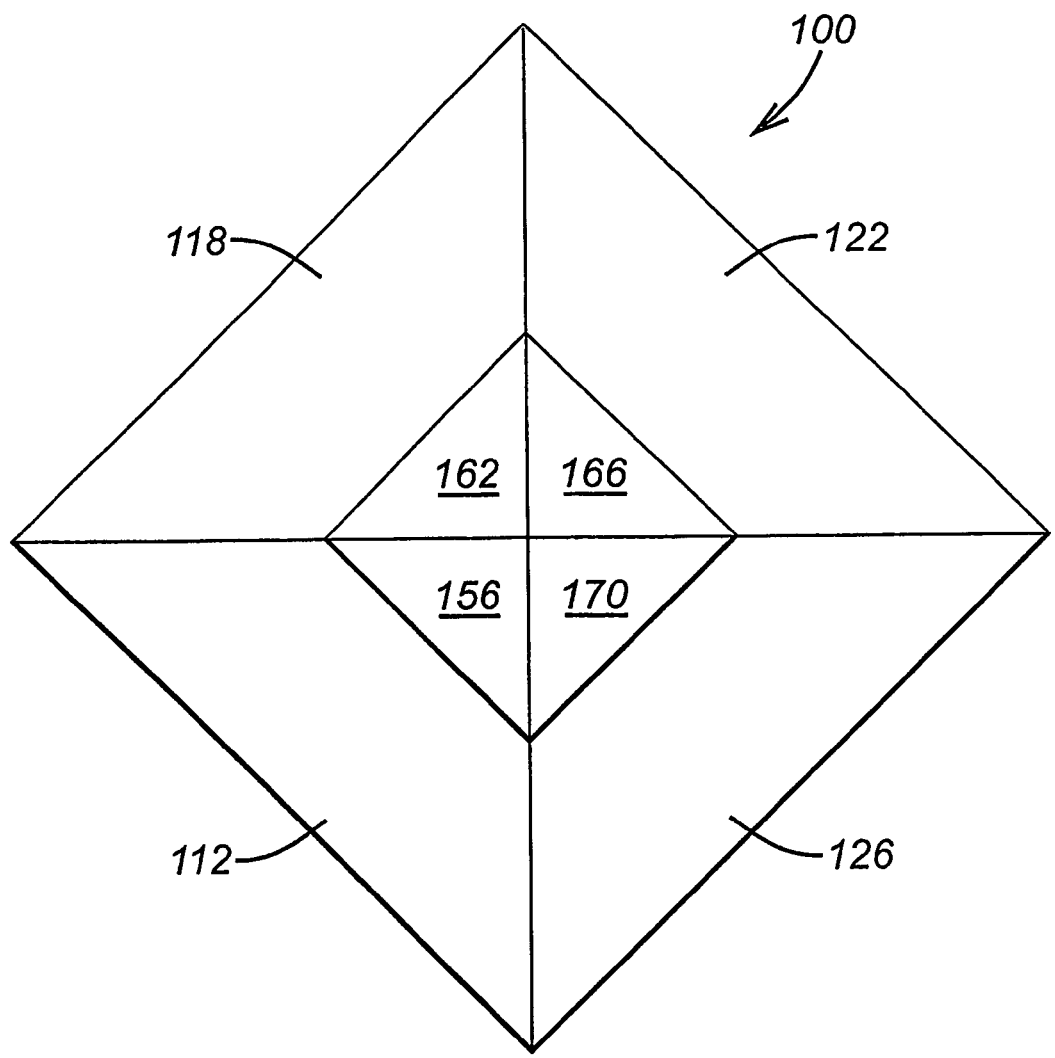
FIG. 7 is a plan view of the sheet of FIG. 6 when made up into the diamond joint 100.
Figure 8:
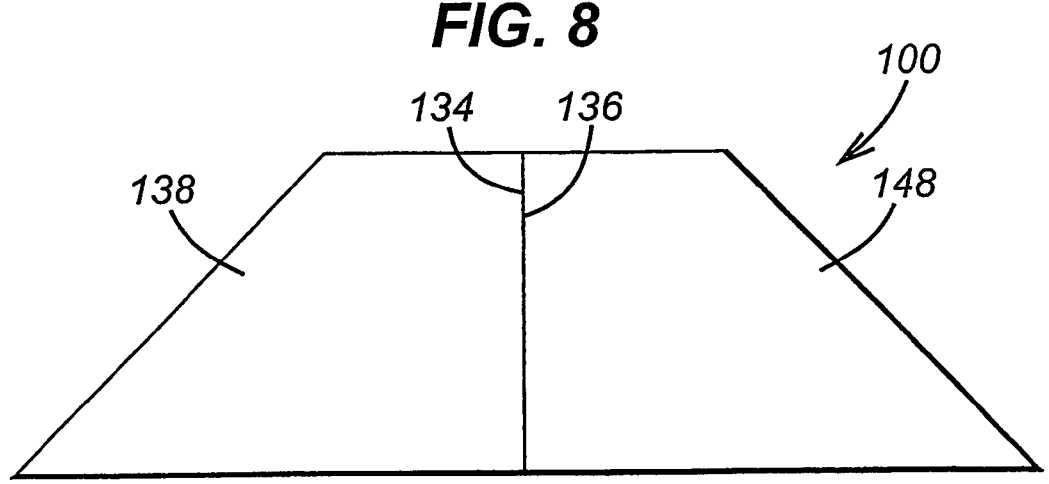
FIG. 8 is a side view of FIG. 7.

In FIG. 6 to 8, like parts to those in FIGS. 1 to 5 have been given the same reference numerals prefixed by the number "1".

As shown in FIG. 6, the sheet that is to be made into a diamond joint includes base panels 112, 114, 116, 118, 120, 124 and 126, panels 134, 136, 138, 140, 142, 144, 146 and 148 that are to extend vertically and panels 156, 158, 160, 162, 164, 166, 168 and 170 that are to be horizontal.

For the central part of the sheet, the panels 156 to 170 are defined by the same cuts 172 and 174 with valley folds 154 connecting those panels to the adjacent vertical panels 134 to 148.

In FIG. 1, the valley folds 32 that connect the base panels 12 to 26 extend parallel to the adjacent sides. However, in FIG. 6, those folds 132 extend from the mid point of each side to the mid point of adjacent sides.

The cuts 128 that separate adjacent base panels at their corner are considerably longer than the cuts 28 in FIG. 1. In addition, the cuts 172 and 174 that separate adjacent centre panels are slightly shorter than those cuts 72 and 74 in FIG. 1.

The assembled diamond joint 100 is shown in FIGS. 7 and 8. Base panels with a cut 128 between them overlap each other and are horizontal such that the panel 112 completely overlaps panel 116, panel 118 overlaps panel 120 and so on. Vertical panels connected by a mountain fold 152 lie alongside, and cover each other on one surface such that panel 134 is alongside panel 136 and so on. The top horizontal panels also completely overlap each other with panel 156 overlapping panel 160 and so on.

Accordingly, with the diamond joint, the structure is of two ply over its complete extent.

FIG. 9 shows a square sheet of fibres to be made into a uniform T-joint. Like parts to those in FIG. 1 have been given the same reference numeral prefixed by the number "2". There are a few differences between the sheets shown in FIGS. 1 and 9 which will now be described.

FIG. 9 shows the cut 228 coming in from the corner of the square between panels 214 and 222 going all of the way to the centre of the square between panels 236 and 244 and panels 266 and 268. Furthermore, the panels 214 and 222 extend along a complete side of the square and are connected to the adjacent panels by a mountain fold 233 rather than a valley fold.

In addition, the vertical panels 236 and 244 extend at 90° from the centre of the square and to adjacent corners of the square resulting in there only being six vertical panels rather than 8.

Furthermore, the top panels 258 and 268 are connected to the single panel 236 by a mountain folds 255 rather than valley folds. The top panels 266 and 268 now have no cut between them and the resultant single panel 266 is connected to the single panel 244 by a mountain fold 255 rather than a valley fold.

The assembled T-joint is shown in FIGS. 10 and 11. Again, as with any of the shapes described herein, the folding steps may be in any order or some folds made at the same time.

The panels 238 and 240 are folded about their common mountain fold 250 to abut each other. Their respective base panels 216 and 218 are folded about the valley folds to lie horizontal.

Then the panel 234 is folded about the valley fold 252 to be perpendicular to the panel 238 and the panel 242 is folded about its valley fold to be perpendicular to the panel 240. The panel 236 is folded about its mountain fold 250, common to the panel 234, such that the panel 236 overlaps and contact, at one side the panel 234 and, at the other side, the panel 242. The panel 244 is folded about its mountain fold 250 such that the panel 242 overlaps completely the panel 236. In this position, the panels 234 and 242 are in the same plane and the panels 236 and 244 overlap each other over their complete extent.

The T joint of FIG. 9 could be combined with the cross joint of FIG. 1. The T joint would be made up without folding the top layers. The layers 338, 348, 346 and 340 would be inserted to lie between the layers 46 and 48 of the T joint to give a combined thickness of six layers. The layers 342 and 344 would be between the layers 34 and 36 and the layers 334 and 336 would be between the layers 42 and 44 to give a thickness of four layers. The top and bottom panels of each structure would be folded over each other as previously described.

Thus the combined joint would be greatly strengthened in one direction and strengthened in two other directions.

Looking at FIG. 10, the vertical wall that goes across the joint wall comprises, at the left hand side the panel 234, the panel 236 and then the panel 244. At the right hand side this comprises the panel 242, the panel 236 and then the panel 244. Consequently the panels 236 and 244 extend across the central part of the joint and that part is of 3-ply to either side of the centre line.

The panels 214 and 232 are folded about their respective mountain folds 233 such that the panel 222 traps the panel 214 vertically, against the panel 244.

The top panels comprise, to the left when viewing FIG. 10, the panel 212 folded about its valley fold 254 then the panel 216 folded about its valley fold. Then the panel 258 folded about its mountain fold 255 and finally the panel 266 folded about its mountain fold. To the right the sequence of panels from bottom to top is 268, 270, 260 and 258.

Simple or other ply stiffeners may be provided between the layers 220 and 218 or 268 and 266 which extends across the centre of the joint to increase the resistance to tension across the joint.

Figure 12:
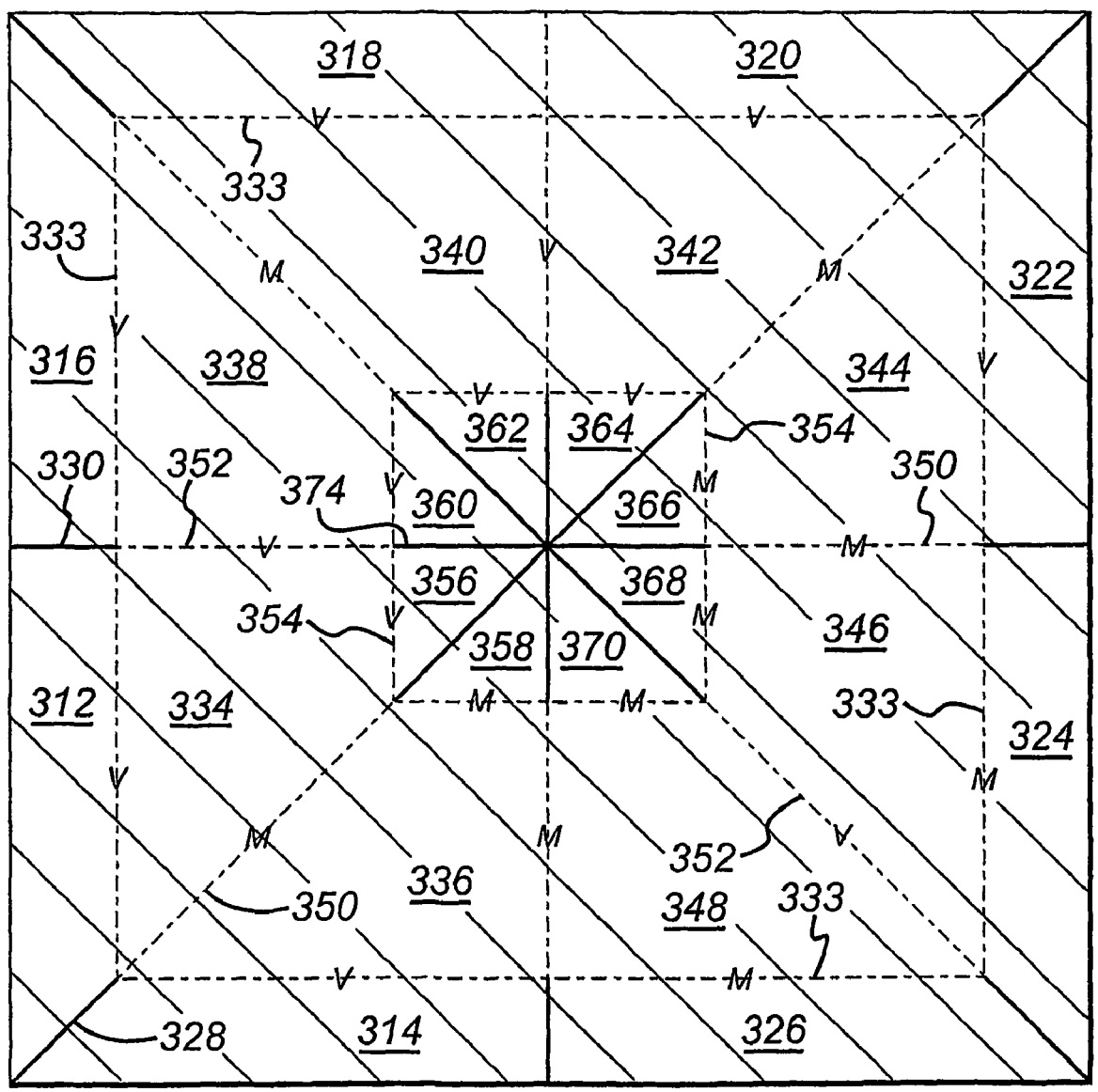
FIG. 12 is a plan view of a sheet of square sheet of fibres to be made up into an underfolded T-joint 300.

FIG. 12 shows a square sheet of fibres to be made up into an underfolded T-joint. Like parts to those in FIG. 1 have been given the same reference numeral prefixed by the number "3". In fact, there are remarkably few differences between FIGS. 1 and 12 even though the joints they form are radically different.

The only differences are in the folds. The base panels 326 and 324 are connected to their adjacent panels 348 and 346 respectively by mountain folds 333 rather than valley folds.

The connection of the vertical panels 334 and 336 and the panels 344 and 246 are by way of mountain folds 350 rather than valley folds and conversely the panels 336 and 348 are connected by a valley fold 352 rather than a mountain fold.

For the top panels, 358, 366, 368 and 370 are connected to adjacent panels by mountain folds rather than valley folds.

To assemble the joint shown in FIGS. 13 and 14 any sequence of folding or partial or continual folding may be used as with the other joints but one particular sequence will now be described.

The panels 348 and 346 are folded about their valley fold such that they abut each other and extend in the centre from top to bottom when viewed in the drawings. The panels 336 and 344 now face forwardly, at right angles to the panels 348 and 346. Base panels 314 and 332 are folded about their valley folds to extend vertically upwardly and lie against the panels 336 and 344 to which they are attached.

Then the vertical panels 334 and 342 are moved about their mountain folds to lie against the panels 336 and 344 respectively. The vertical panels 338 and 340 move about their valley folds and their common mountain fold such that they lie against the panels 348 and 346 respectively. Thus the joint is 4-ply thick in the "upright" of the T-joint.

The base panel 324 is folded about its mountain fold to lie beneath the base panel 318 which is folded about its valley fold. Likewise the base panel 326 is folded about its mountain fold to lie beneath the base panel 316.

Figures 13, 14:
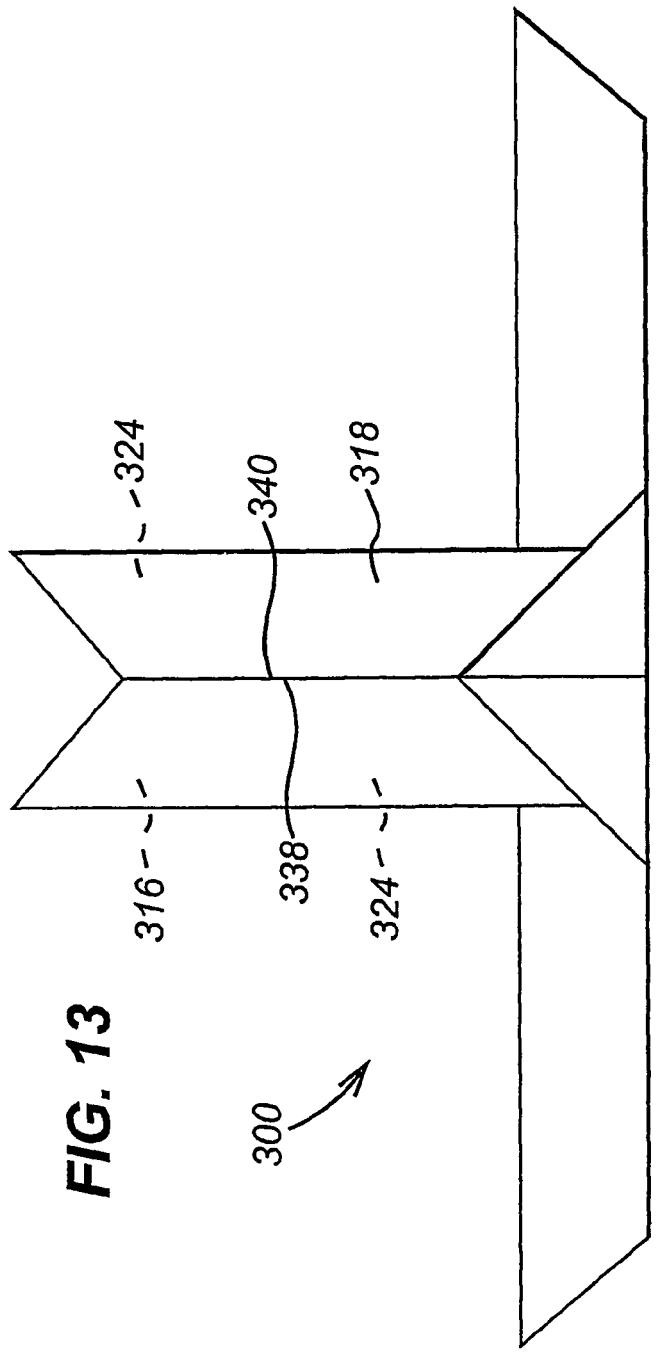
FIGS. 13 and 14 are plan and side views respectively of the T-joint 300.

The top panels are folded such that, from the bottom up, to the left of the joint when viewed in FIG. 13, lie side-by-side panels 360, 370, 356 and 358. To the right, from the bottom up, lie panels 318, 364, 358 and 366.

If desired, strengthening tape 376 comprising UD fibres or woven fibres or both could be placed across the panels 336 and 344, possibly by being enclosed by the panels 334 and 342.

Figure 3:
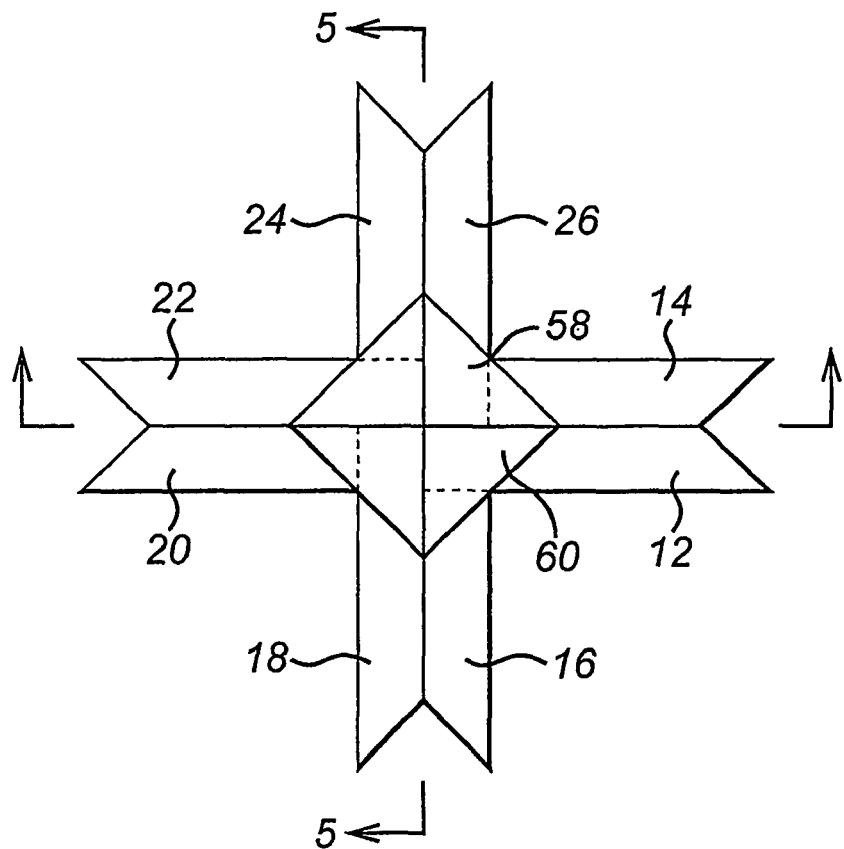
FIGS. 3 and 4 are respectively, a plan view and a side view of the cross joint.
Figure 15:
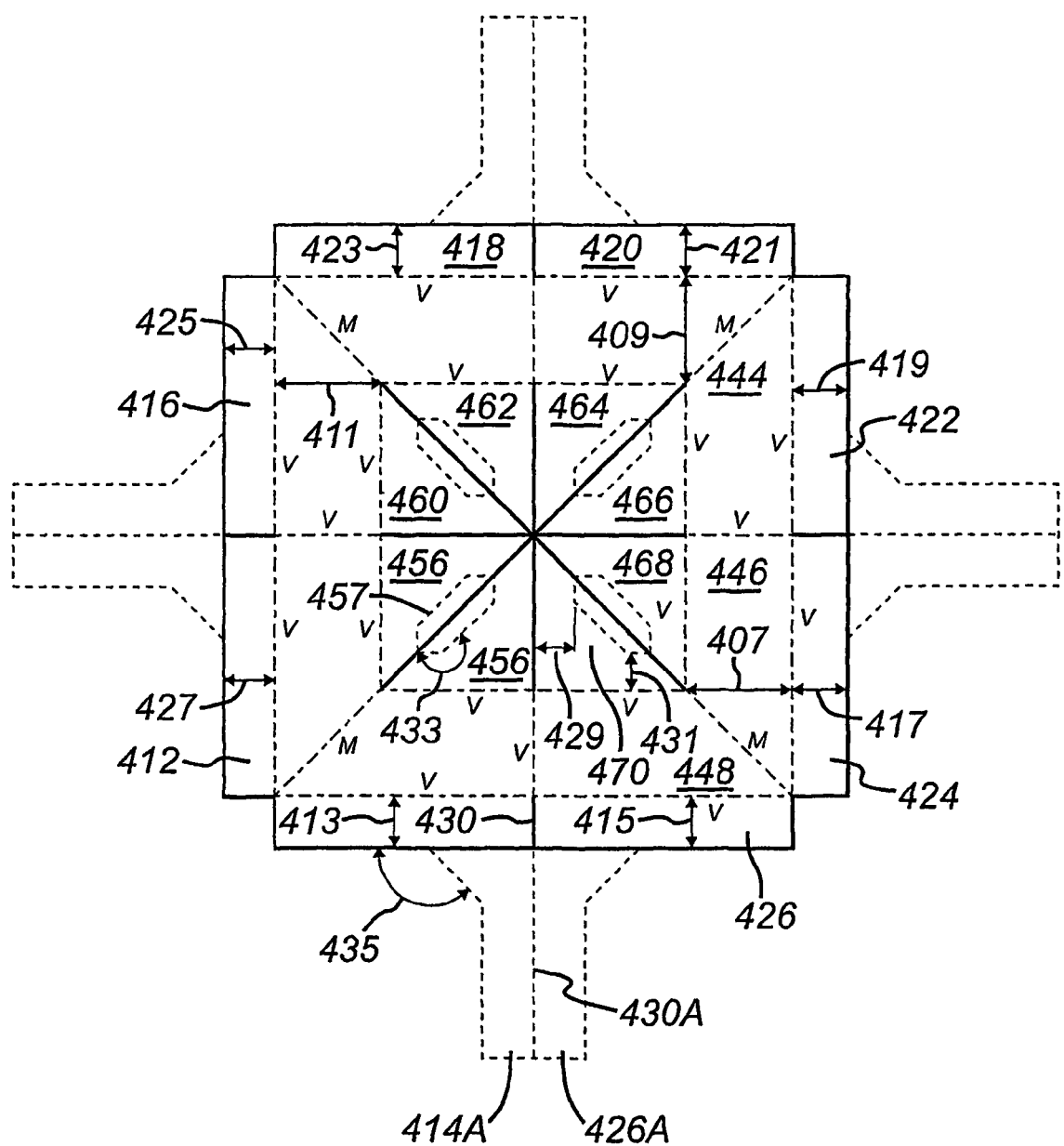
FIGS. 15 to 19 are plan views of sheets showing modified cross joints.

FIG. 15 is a cross-joint member similar to that shown in FIG. 1 which can be folded as described to arrive at a shape similar to that shown in FIGS. 2 to 4. Like parts to those shown in FIG. 1 have been given the same reference numeral prefixed by the numeral 4.

It can be seen from FIG. 14 that the centre panels 456 to 470 are much larger in proportion to the panels 434 to 448 than in the corresponding panels in FIG. 1. This gives rise to a much larger horizontal top region than that shown in FIG. 2 with the top horizontal panels being much closer to the base of the panel. In fact, various controls can be applied to dimensions in order to alter the requirements or performance of this joint. Indeed similar controls can be applied to any of the joints referred to herein but the control applied to the joint in FIG. 15 will now be described in detail.

The dimension 401 dictates the overall length of the joint (subject to a modification to be described later). The dimensions 403 controls the overall length of the joint. Dimensions 405, 407, 409 and 411 dictate the end height of the joint legs. Dimensions 413, 145, 417, 419, 421, 423, 425 and 427 dictate the width of the flanges.

Adjacent panels 456, 458 and 468, 470 and so on have, along their sides, complementary shaped cuts 457. These start from their common cut away from the ends of the cut 472, diverge away from that cut and then meet again, away from the ends of the cuts. When in the assembled condition shown in FIG. 2, for instance, the cuts give the top platform the shape shown in chain lines 457 thereby saving weight.

The dimensions 429 and 431, shown as panel 470, define the distance from the cut on that panel to the nearest point of the cut 457 and the fold of that panel to the nearest part of the cut 457 respectively to define the width of the removal portion formed by the cut.

The shape of the cuts 457 could be altered as desired. For instance, the angle 433 shown on page 458 could be curved or have a different angle between two straight cuts over the area shown.

Also shown in FIG. 15 are side extension panels 414A, 426A and so on that come out from the junction of adjacent panels 414 and 426 and that are separated by a cut 430A in line with the cut 430. When the cross joint is formed, these panels 414A and 426A lie horizontally with complete overlap between the inner low corners of the joint as shown by the chain line 414A in FIG. 2. This provides significant integral reinforcement across the joint at that part. It will be appreciated that the panels 414A, for instance, could be closer to the free end off the panel 414 to increase this strengthening or indeed the dimension or angle 435 could be varied in relation to this embodiment or any other embodiment.

FIGS. 16 to 19 show alternative forms of cross joints. Like parts to those to FIGS. 1 to 5 have been given the same reference numeral prefixed by the numbers 5, 6, 7 and 8 respectively.

Figure 16:
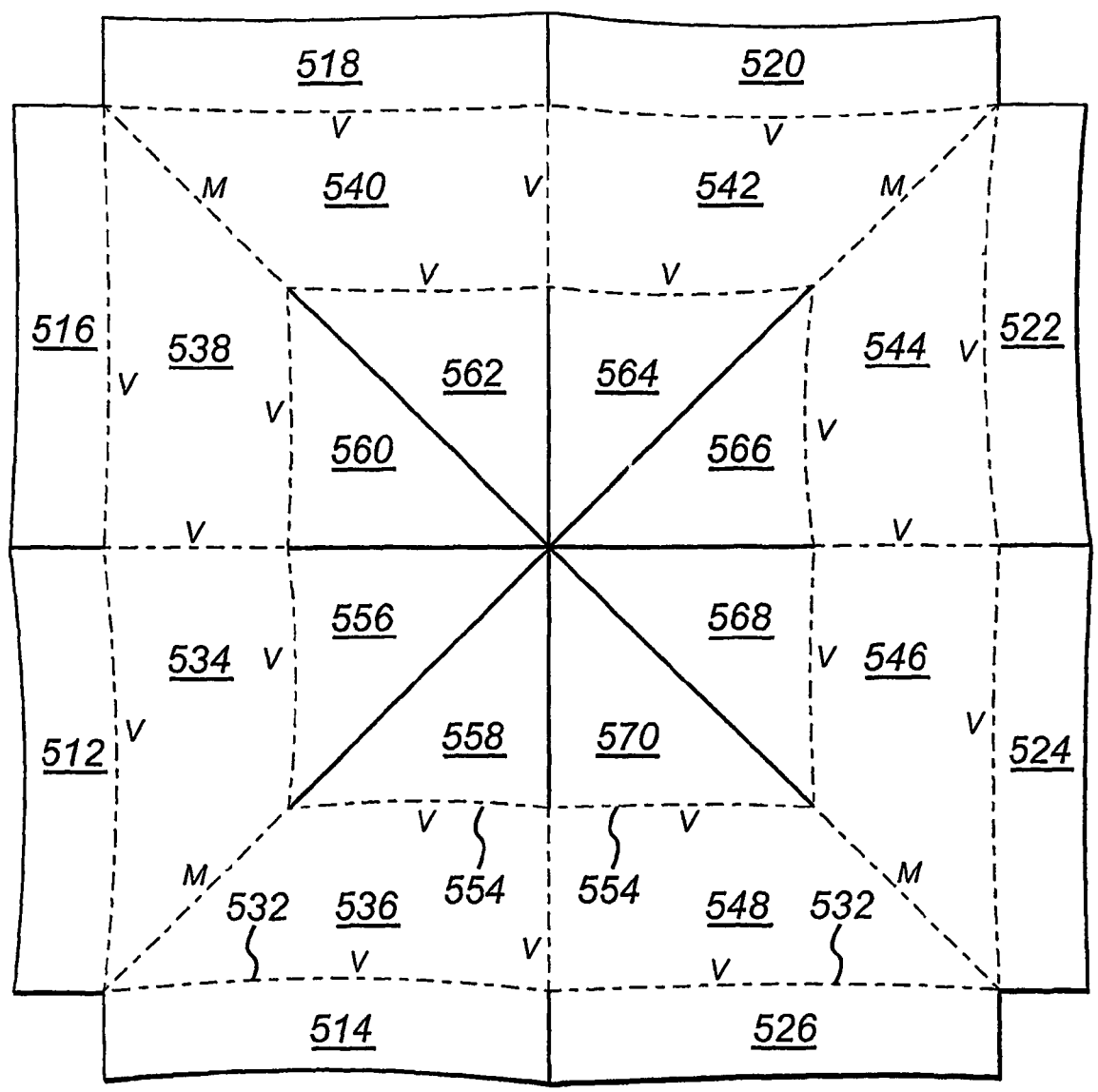

In FIG. 16 the panel 514 is defined, on its outwardly facing longest edge, by a curve of 0.5 m. A curve of the same radius defines the fold 532 between the panels 514 and 536 with the fold 554 between the panels 536 and 558 also being of the same radius. The adjacent panels 526, 548 and 570 are also corresponding curved about a radius, this radius being larger and being 1 m although any radius can be selected or defined. Going around the layer, the corresponding panels are also curved with there being a 1 m radius on the relevant portions on the quarter including panel 536, 0.5 associated with panel 544, 0.5 associated with panel 542 and so on. The aligned folds and cuts that meet in the centre of FIG. 16 remain straight.

When the panels 543 to 548 are folded upright they meet over their complete co-extent. The panels 512 and 514, for instance, meet at their common curved folds which are both of the same radius. Those panels are then bent such that their downwardly facing surface is curved. The opposite panels 520 and 522 have the same radius of curvature. The other parts 524, 526, 516 and 518 have less of a curve at 1 m. Thus the base of the panel can make good contact with a surface skin having similar changes in curvature in different directions. The curvature effected by the upper panels 556 to 560 corresponds to the curvature of the lower panels. The curvature of the panels further increases the strength of the structure. In this respect, a curved panel is less likely to bend when subject to a force against its face than a straight panel.

Figure 17:
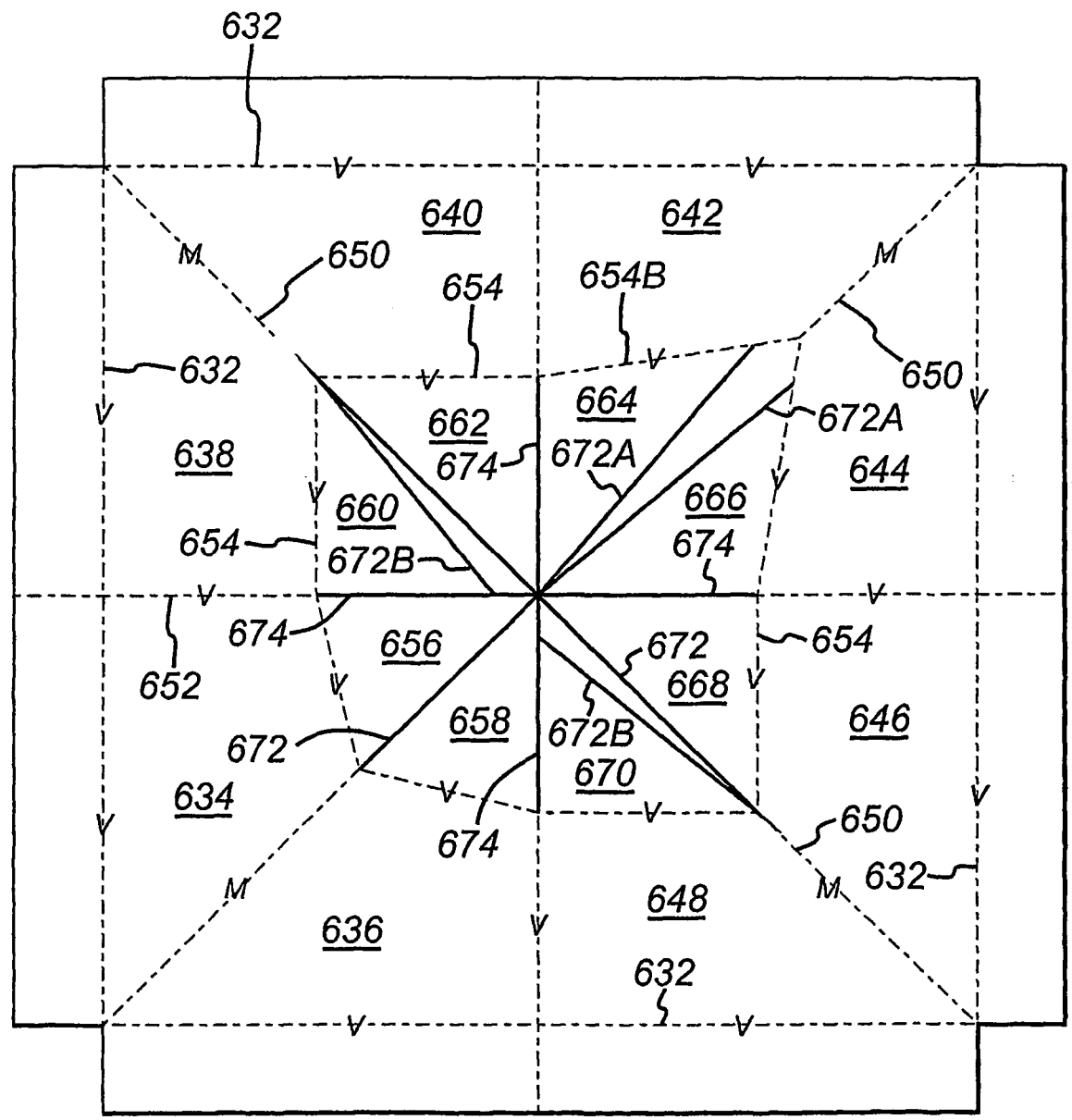

Referring now to FIG. 17, the differences from FIG. 1 comes in the line of the folds 54 and the line of the diagonal cuts 72.

The panels 638 and 646 and the opposing panels 638 and 640 have folds 632 and 654 that are parallel, as in FIG. 1. The remaining folds 654 though are not parallel.

The folds 654A that meet on the fold between panels 634 and 636 diverge from their connection with the folds 652 away from their associated folds 632 to meet on the fold 650. The cut 672 remains in line with the fold 650 to the centre of the sheet, as do the four cuts 674. The folds 654B between the panels 642 and 642 are inclined in the opposite direction to the folds 654A. However the folds 654B do not quite meet. They are separated by cuts 672A that start from the centre and which extend towards the fold 650 between the panels 642 and 644 with the cuts each diverging slightly from the line of the fold 650 to leave a small space between the folds 672A and the panels 642 and 644.

The centre panels 660 and 670 have cuts 672B that extend from their associated fold 650 towards the centre but which diverge outwardly slightly, away from the adjacent cuts 672.

When the sheet of FIG. 17 is folded, the top panels 656 to 670 define an upper plane that is not horizontal, as in FIG. 2. Instead those panels define a plane that extends downwardly from the joint between the panels 636 and 634 towards the joint between the panels 642 and 644 with a line through the plane being at the same height from the base where that line passes through the joint between the respective panels 638, 640 and 646, 648.

Figure 18:
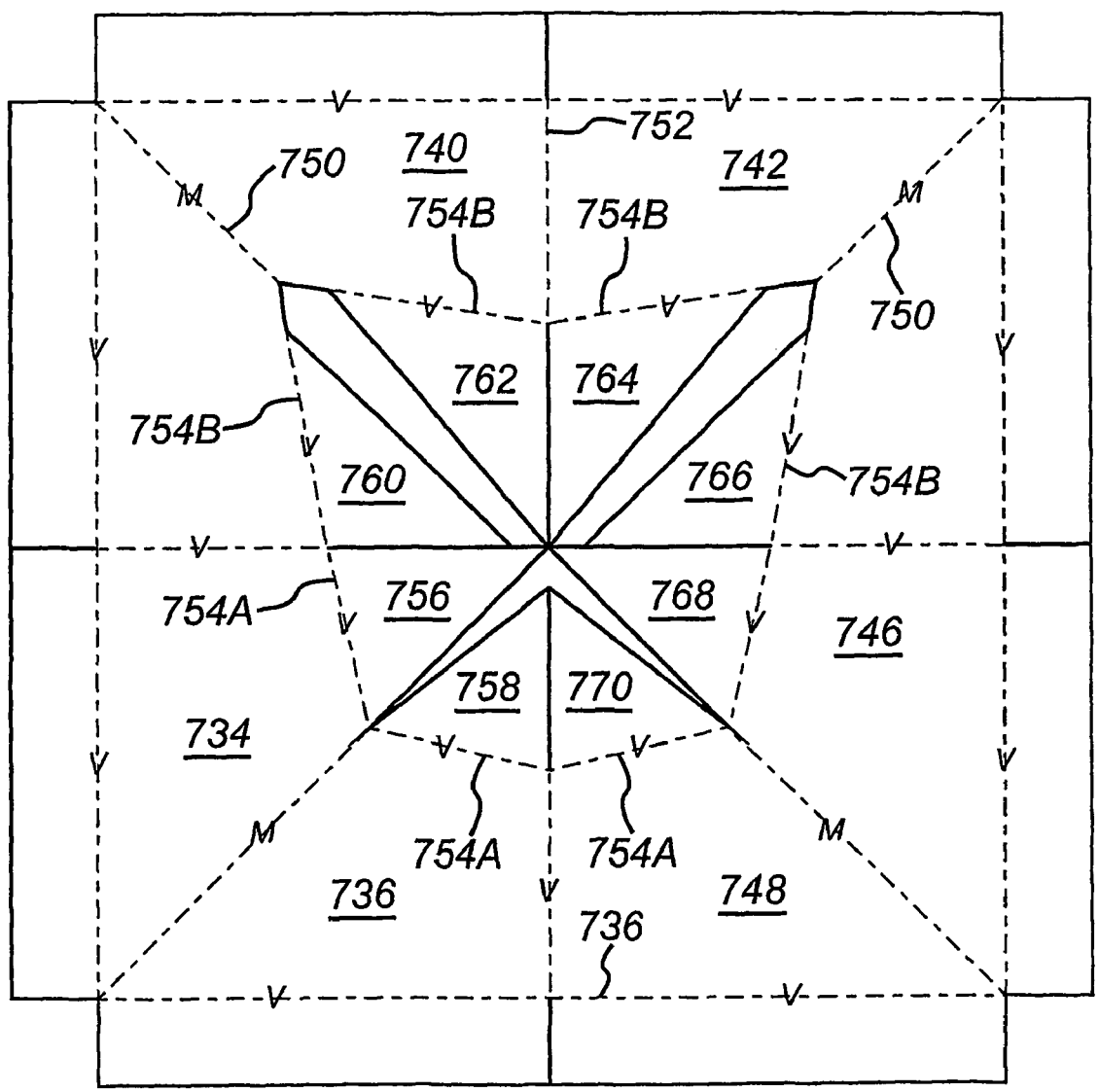

FIG. 18 is similar to FIG. 17. However, none of the folds 754 are parallel to folds 732. The folds 754A between the top panels 758 and 770 and their respective panels 736 and 748 are inclined towards the folds 732 in the direction towards where those panels rest. The folds 754A on panels 734 and 746 are also inclined in that direction. The remaining folds 754B are each inclined in the opposite direction.

Both sides of the top panels 756, 768, 764 and 762 extend to the centre of the sheet. However, the cuts on panels 762 and 764 that extend towards their respective folds 750 are at a slight angle to those folds. The panels 760 and 766 have cuts that are parallel to their respective folds 750 and thus they do not extend to the centre of the sheet. The remaining top panels 758 and 770 have cuts which commence from their associated folds 750 but extend at a slight angle to the line of the folds 750 such that they meet each other, but not in the centre.

When the sheet of FIG. 18 is folded the top panels 756 to 770 define a plane that extends downwardly towards the valley fold 752 between upwardly extending panels 740 and 742 with lower edge of the plane being of equal height where it meets the mountain folds of those panels.

Figure 19:
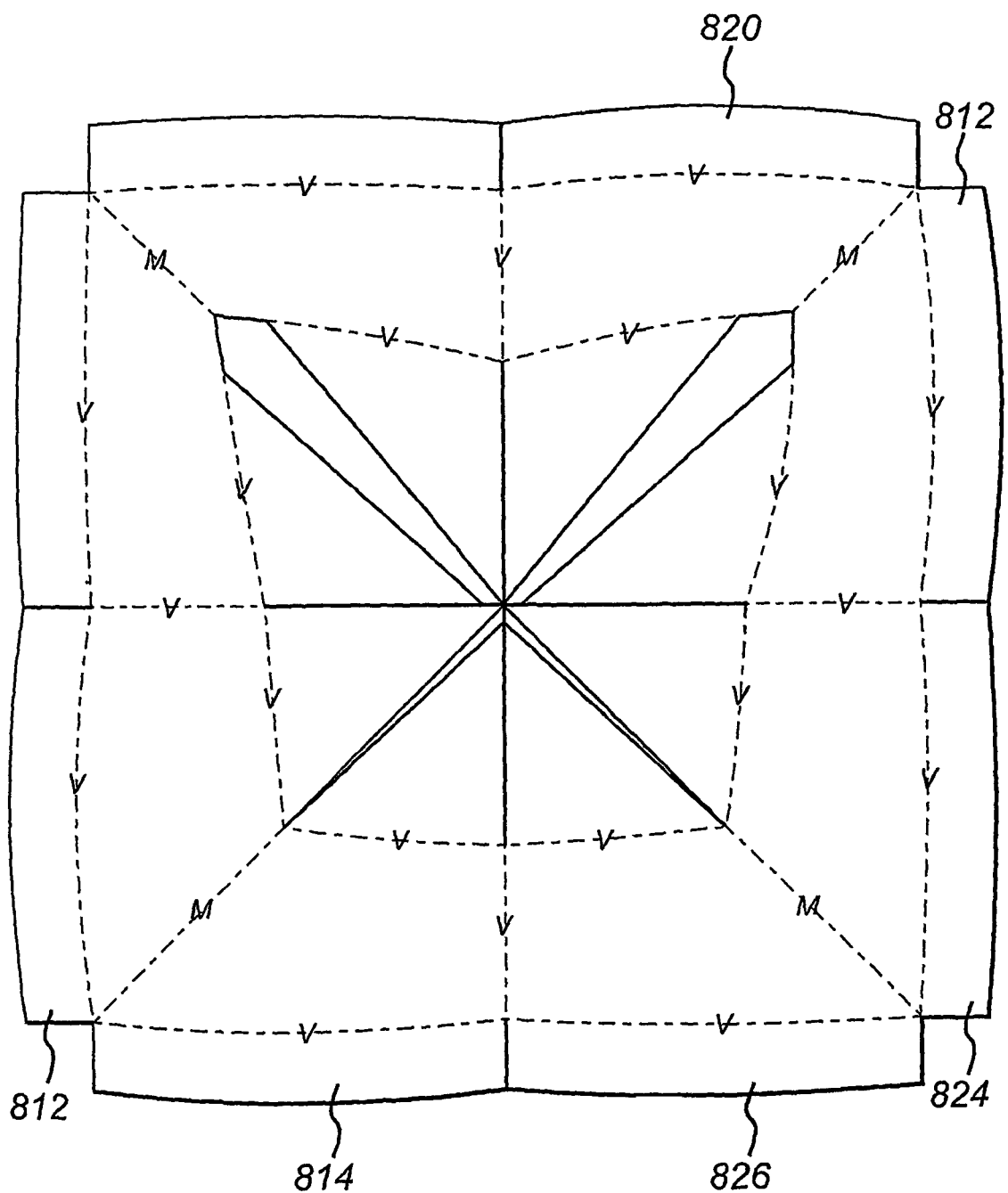

FIG. 19 is a combination of the sections of FIG. 18 that gives the sloping top surface and FIG. 16 that gives curvature. In FIG. 19 though the curvature is convex, when viewed from the side, rather than convex. However, the radius of panels 812 and 814 is still 0.5 m and the radius of panels 826 and 824 is 1 m. It will be appreciated that the radius could be the same for all panels or some panels may not have a radius or the radius of opposed top or bottom panels (such as the panels 812 and 814 and the panels 820 and 822) or both could be such that they are on a common arc.

Figure 20:
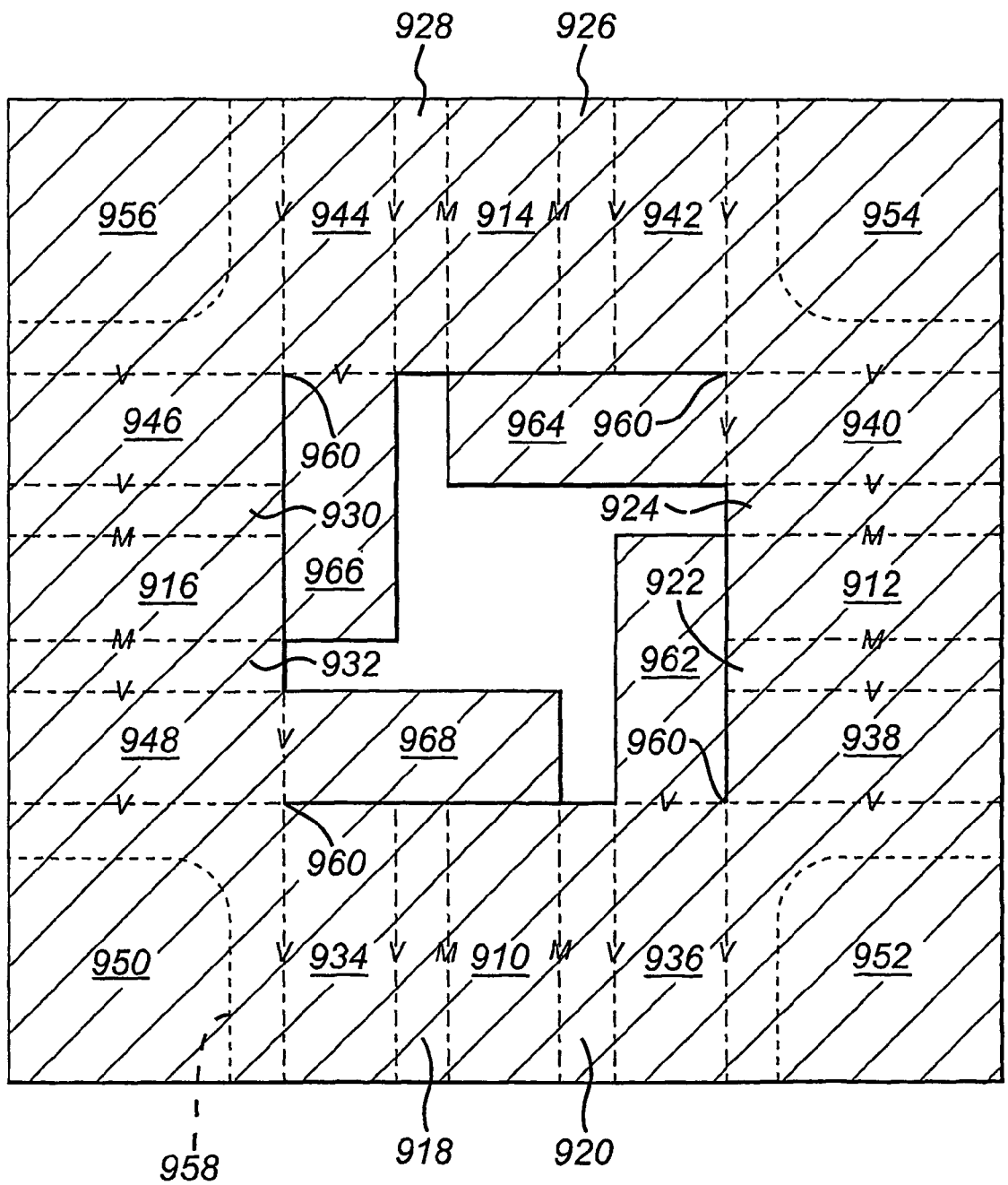
FIG. 20 is a plan view of a sheet that can be made up into a cross I-beam joint.

FIG. 20 is a plan view of a sheet that can be made up into an integrated cross over I beam.

The top or the I is comprised by four upper I panels 910, 012, 914 and 916 each connected by parallel mountain folds to under panels 918, 920, 922, 924, 926, 928, 930 and 932 on either side.

The vertical part of the I beam are formed by eight vertical panels 934, 936, 938, 940, 942, 944, 946 and 948. These panels are connected to the under panels by valley folds which are parallel to the mountain folds of the under panels.

The base of the I is comprised by four base panels 950, 952, 954 and 956. Each base panel is connected to vertical panels by two right angled valley folds, each of which is parallel to the top valley fold of the vertical panel along which the base panel extends.

The cross-over I beam is formed by folding the under panels 918 and 920 through 180° about the mountain fold such that the under panels each overlap half of the upper panel 910. The vertical panels 934 and 936 are folded through 90° about their connection to the under panels such that the vertical panels contact each other and are co-extensive over their complete extent.

The base panels 950 and 952 are folded through 90° about their valley fold such that upper panel 910 overlaps part of each base panel. Each base panel could have a portion defined by the chain line 958 removed, to save weight, for instance. The line 958 is rounded to enhance the strength of the joint.

Figure 21:
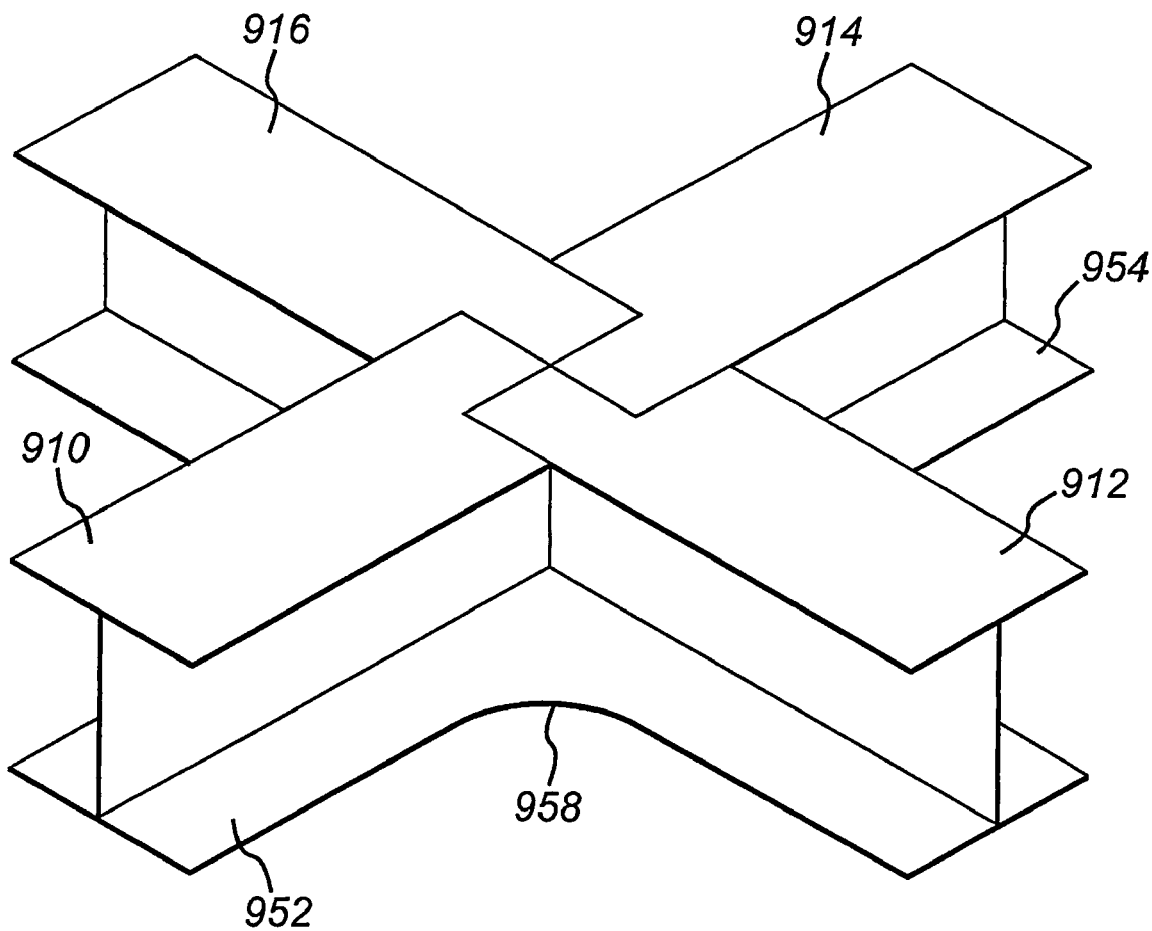
FIG. 21 is a perspective view of the joint made according to FIG. 20.

The corresponding other four sides of the panel are each assembled in the same manner. It will be appreciated that the inner regions of the top of the I will overlap each other. The assembled panel is shown in perspective in FIG. 21.

In the erected configuration, points 960 all come together at the centre of the joint.

The sheet also includes four strengthening panels 962, 964, 966 and 968. These are each connected to respective panels 936, 940, 944 and 948 by valley folds. In the assembled joint they are folded about 90° such that the panel 962 lies between the vertical panels 938 and 940 to provide cross joint reinforcement. The other panels are similarly folded to lie between different vertical panels.

The cross-over I joint is able to receive I beams which can lie between the base and top panels and trap the vertical panels there between with the I beams extending to a location remote from the joint, for instance to similarly connect with a further cross-over I joint at the other end of the beam.

FIG. 22 is a plan view of an aircraft panel comprising a skin 1000. The skin 1000 could be planar or curve in one direction or more. For instance the panel could comprise part of a nacelle for an engine, or part of a fuselage or wing structure. The edges of the panel may be coextensive with the panel. Alternatively they may extend up and may further extend part of the way back over the panel to form a U-section.

The panel includes four uniform T-joints 200 along each longer side 1002 with two diamond T joints 200 being located at one shorter side and two cross or diamond L joints 10' or 100' being located on the opposite shorter sides. The joint 10' is formed in the following manner. It will be appreciated that the other joints including the joint 100' could be divided to form different joints to those previously described.

Looking at FIG. 1, the sheet 10 is cut from the middle of one side to the middle of the other side. Then the joint is formed as previously described. The only exception is that panels 56 and 68 (when the cut in the sheet is horizontal) are folded through 90° about a mountain fold rather than the valley fold. The joint 100' is formed by cutting across a diagonal of the sheet 100.

The joints 10', 10'; 100', 100' are spaced slightly apart from each other, either side of a gap 1006 in the side wall. Other aircraft structure can then be joined to the joints 10', 10'; 100', 100' such as part of a hinge.

Each joint along the edges is connected to each other or to an adjacent corner of the panel by I beams or back to back "C" sections 1004.

In from the edges of the panels are various other joints comprising diamond joints 100 and cross joints 10. These are each connected to adjacent joints by I beams 1004.

The panel is made up by laying the joints and I beams on the skin 1000. Moulds are inserted to maintain the shape of the joints and beams. The structure is then carbonised to make the parts hard. The beams and joints can be connected to each other and the skin by adhesive or Z pins or both, if desired.

Whilst the flat sheets have been described as square, they could take any shape.

Although the sheets have largely been described as being of single thickness they could comprise more than one layer. The layers may or may not be connected. When connected, they may be connected by cross linking fibres which may be any convenient means such as by needling or air blowing or by Z pins which may be inserted by ultrasonics. Where more than one layer is used, this may be effected by simply placing one sheet over another.

It will be appreciated that in some instances the overlap of layers could take other sequences. These described are optional sequences. For instance, in FIG. 13 the top panel sequence from the bottom up could comprise 370, 360, 358 and 356.

Whilst references are made to top, vertical and base, it will be appreciated that these are for ease of reference only and the joints could be utilised in any orientation.

With the present invention, a stock of square or other shaped sheets can be kept ready to form into a shape. If desired, the stock need not be ready cut and or ready folded. Cuts can be made by a water jet or any other means.

The fibres used herein are carbon fibres but the present invention is not limited to such fibres. The fibres could include carbon fibres or glass fibres or kevlar, for example, or any combination thereof. In use the joints will be held in a mould to assist in the shaping and to hold the shape. These are then placed in an autoclave to heat the joint and carbonise the fibre resin.

In use, the joints could be used in aircraft structures but the present invention is not restricted to such structures and could be used in any appropriate industry such as the automotive industry. Furthermore, the joints are not restricted to the scales shown herein.

Any of the adjacent layers can be assisted in being held together by passing Z pins through the layers or, alternatively or additionally, by bonding the layers together with adhesive.

Other component parts can be attached to or connected between joints. For instance, as seen in FIG. 2, two U-shaped structural members 8 are arranged to be brought in from either side of the joint and to have their lower horizontal members secured to the base panels 22 and 24 respectively and their horizontal upper panels being secured to the horizontal top panels of the joint. The vertical panels of each U-shaped member are alongside opposite faces of the upright of the joint and are secured thereto. Other faces of this joint or other joints may be connected to similar or different structures. If desired, the structural members could be of carbon fibre and, again, if desired, the joint and other structural members could be carbonised together. If desired, the joint could be partially cured or partially carbonised before being assembly into the structure.

In this way it can be seen that complicated structures can be built up.

In the illustrated embodiments it will be appreciated that different structures can be formed by making the cuts longer or shorter. For instance, in FIG. 1, if the cuts at the centre are made longer then the resulting joint will have less height and a bigger top horizontal platform.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of making a fibrous structural member comprising:
    folding first and second portions including continuous filaments about a first common fold such that the first and second portions are adjacent and substantially parallel to each other;
    folding a third portion about a second fold common with the first portion such that the third portion extends from the first and second portions at an angle thereto; and
    folding a fourth portion about a third fold common with the third portion such that the fourth portion is adjacent and substantially parallel to the third portion;
    wherein the first and second folds are along adjacent sides of the first portion; and folding the at least one ninth portion about a seventh fold common with the first portion; and folding a further, different ninth portion about a fold common with the third portion.

2. The method as claimed in claim 1 in which the angle at which the third portion extends from the first and second portions is perpendicular.

3. The method as claimed in claim 1 in which the line of the first fold is made at an angle in the region of 45° to the line of the second fold.

4. The method as claimed in claim 1 in which the third fold is at an angle in the region of 45° to the second fold.

5. The method as claimed in claim 1 comprising folding the first, second, third and fourth portions to form a structural member having walls extending in the exact direction of X, Y and Z axes.

6. The method as claimed in claim 1 including fifth and sixth portions comprising folding a fifth and a sixth portion about a fourth fold common with those portions.

7. The method as claimed in claim 6 comprising folding the fourth and fifth portions about a fifth fold.

8. The method as claimed in claim 6 in which one end of the first and second portions and one end of the fifth and sixth portions are in generally the same region.

9. The method as claimed in claim 1 including seventh and eighth portions comprising folding seventh and eighth portions to be adjacent to each other, such as about a sixth fold.

10. The method as claimed in claim 9 in which the seventh and eighth portions extend in the same plane as the fourth and third portions.

11. The method as claimed in claim 1 in which at least two ninth portions overlap each other.

12. The method as claimed in claim 1 in which at least two ninth portions are planar over at least part of their extent and inclined upwardly or downwardly from the first and second portions when the first and second portions extend vertically.

13. The method as claimed in claim 1 including a tenth portion comprising folding the tenth portion about an eighth fold common with the first portion.

14. The method as claimed in claim 13 comprising causing at least one ninth portion and one tenth portion to face each other over at least part of their co-extent.

15. The method as claimed in claim 13 when including a tenth portion or portions comprising defining a portion of decreasing distance to the eighth fold in one direction along the eighth fold which decreasing distance results in the portion formed by the eighth fold reaching the end of the eighth fold.

16. The method as claimed in claim 1 comprising folding a tenth portion about a fold common with the third portion about an eighth fold.

17. The method as claimed in claim 16 in which the seventh and eighth folds, when on a common first portion are parallel to each other.

18. The method as claimed in claim 1 comprising at least one ninth portion or, alternatively or additionally, at least one tenth portion being curved.

19. The method as claimed in claim 1 comprising causing the first portion to be co-extensive with the second portion over the complete extent of the first portion but only part of the co-extent of the second portion.

20. The method as claimed in claim 1 including a fifth portion comprising causing the fifth portion to be coextensive with the second portion over the complete extent of the fifth portion but only part of the second portion.

21. The method as claimed in claim 1 including a sixth portion in which the sixth and second portion are coextensive with each other over their complete co-extent.

22. The method as claimed in claim 1 including a fifth and a sixth portion comprising causing the sixth or second portions to be adjacent to the first and fifth portions.

23. The method as claimed in claim 1 including a sixth, seventh and eighth portion in which the seventh and eighth portions are folded about the sixth and second portions respectively to lie adjacent to each other.

24. The method as claimed in claim 23 comprising causing the seventh and eighth portions to be located between the fourth and third portions.

25. The method as claimed in claim 24 comprising causing the third, fourth, seventh and eighth portions to be co-extensive over their complete extent.

26. The method as claimed in claim 1 in which all of the portions are arranged to be integral with each other.

27. The method as claimed in claim 26 comprising making the structural member by folding the portions from a flat form.

28. The method as claimed in claim 27 comprising folding aflat form having continuous fibres extending in at least one direction such that those fibres, when folded, extend in a different direction between adjacent portions.

* * * * *